United States Patent [19]

Sharnoff

[11] Patent Number: 4,725,142
[45] Date of Patent: Feb. 16, 1988

[54] DIFFERENTIAL HOLOGRAPHY

[75] Inventor: Mark Sharnoff, Newark, Del.

[73] Assignee: University of Delaware, Newark, Del.

[21] Appl. No.: 894,484

[22] Filed: Aug. 11, 1986

Related U.S. Application Data

[63] Continuation of Ser. No. 534,221, Sep. 20, 1983, abandoned.

[51] Int. Cl.$^4$ .......................................... G01B 9/025
[52] U.S. Cl. .................................................. 356/347
[58] Field of Search ............................... 356/347, 348

[56] References Cited

U.S. PATENT DOCUMENTS

| | | | |
|---|---|---|---|
| 3,511,554 | 5/1970 | Osterberg et al. | 350/12 |
| 3,528,719 | 9/1970 | Brooks | 356/347 X |
| 3,649,754 | 3/1972 | Macovski | 178/6.8 |
| 3,670,098 | 6/1972 | Korpel | 356/347 X |
| 3,715,164 | 2/1973 | Heflinger | 356/109 |
| 3,719,076 | 3/1973 | Mottier | 73/71.3 |
| 3,728,006 | 4/1973 | Brooks et al. | 356/347 X |
| 3,735,036 | 5/1973 | Macovski | 178/6.8 |
| 3,740,111 | 6/1973 | Gorog et al. | 350/3.5 |
| 3,762,215 | 10/1973 | Aleksoff | 73/71.3 |
| 3,764,216 | 10/1973 | Bliek | 356/106 |
| 3,786,180 | 1/1974 | Macovski | 178/6.5 |
| 3,802,758 | 4/1974 | Havener et al. | 356/347 X |
| 3,826,555 | 7/1974 | Matsumoto | 350/3.5 |
| 3,828,126 | 8/1974 | Ramsey, Jr. | 178/6.8 |
| 3,990,296 | 11/1976 | Erikson | 73/67.5 |
| 4,464,052 | 8/1984 | Neumann | 356/347 |

OTHER PUBLICATIONS

Collins, "Difference Holography", Applied Optics, vol. 7, No. 1, pp. 203-205, 1/68.
"Holography, 1948-1971", by Dennis Gabor, pp. 299-313, in Science, Jul. 28, 1972, vol. 177, No. 4046.
"Optical Image Synthesis (Complex Amplitude Addition and Subtraction) by Hollographic Fourier Transformation", by D. Gabor, G. W. Stroke, R. Restick, A. Funkhouser and D. Brumm, pp. 116-118, in Physics Letters, Aug. 15, 1965, vol. 18, No. 2.

Primary Examiner—Davis L. Willis
Assistant Examiner—Matthew W. Koren
Attorney, Agent, or Firm—Connolly and Hutz

[57] ABSTRACT

A method and apparatus for holographic inspection adapted to the determination and characterization of intermittent stressing of objects.

9 Claims, 27 Drawing Figures

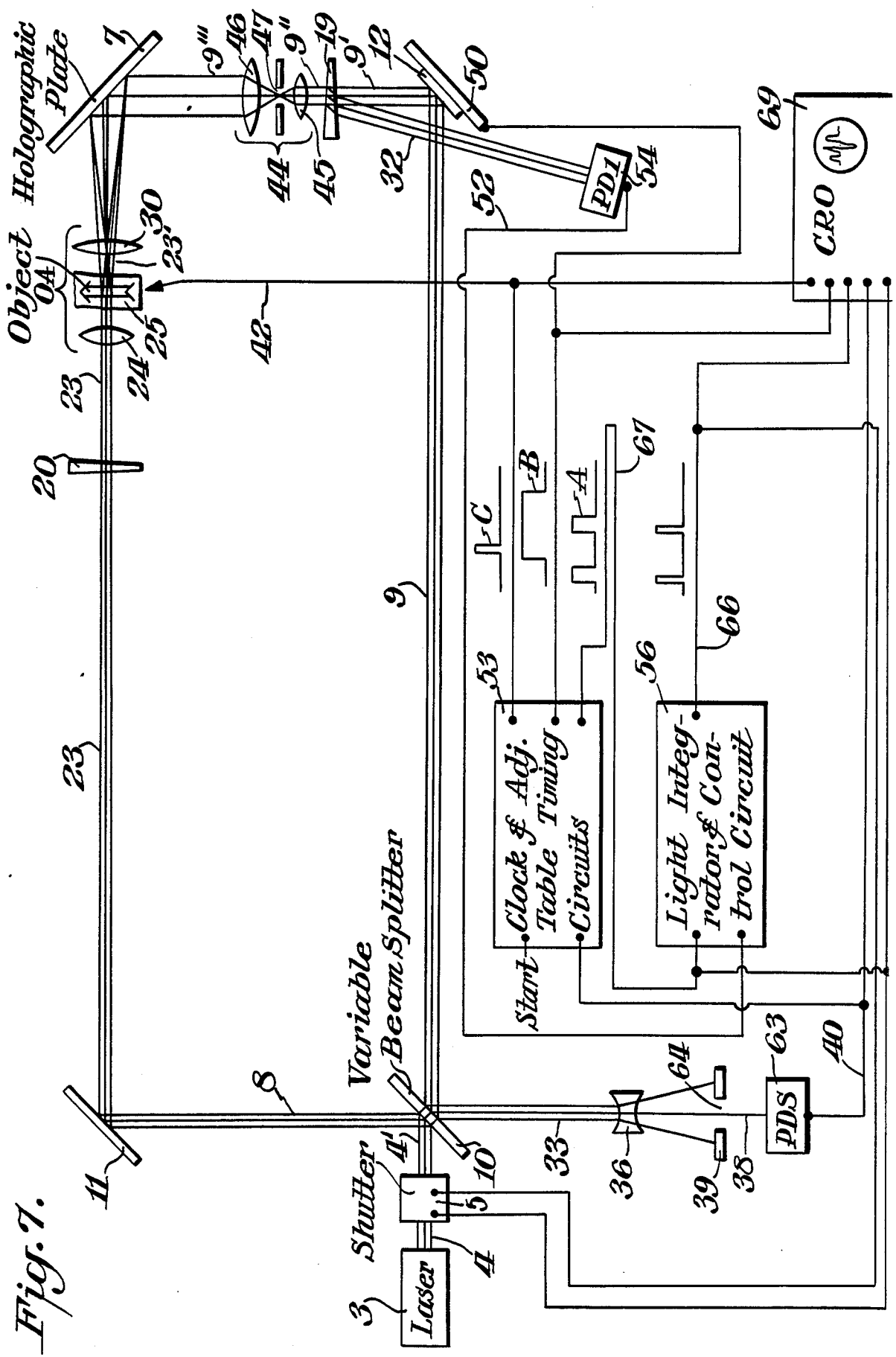

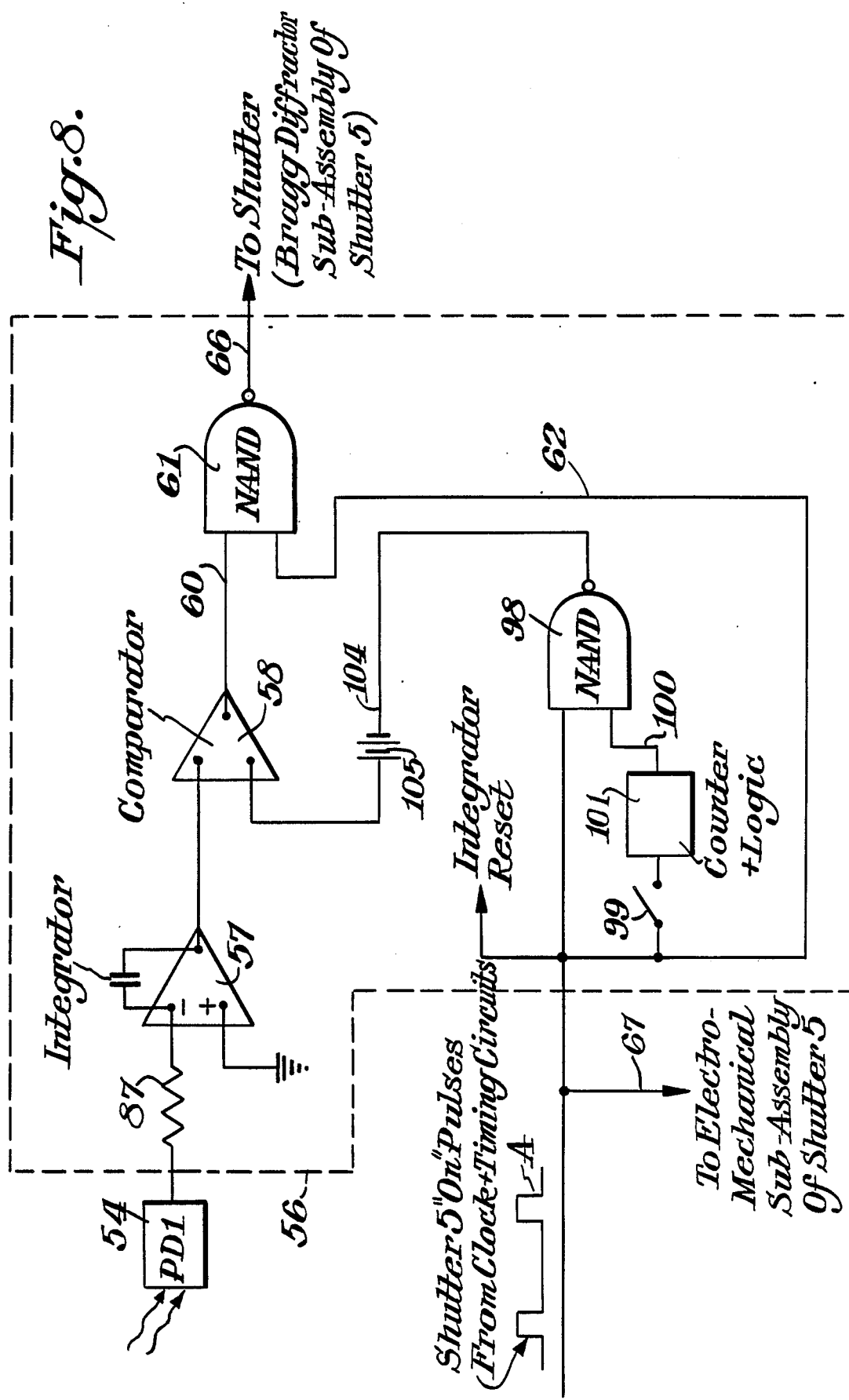

⊢200μM⊣

⊢200uM⊣

⊢200uM⊣

|—50uM—|

|—50uM—|

DIFFERENTIAL HOLOGRAPHY

This application is a continuation of application Ser. No. 534,221, filed Sept. 20, 1983, now abandoned.

BACKGROUND OF THE INVENTION

The present invention relates to a method and apparatus for the detection, measurement, and general evaluation of minute strains in a wide variety of objects, including animal muscle fibers, integrated electronic circuit chips, composite materials and other specimens which thus far have defied appraisal on a micro and sub-micro scale.

The a prior characterization of stress in any given material is essentially impossible to attain. Accordingly, this invention provides an inspection method which is, optionally, dependent on a preselected radiation phase, or amplitude, or a wide choice of combined phase and amplitude simultaneously. In this way a repetitive inspection method, for any given structure in examination, is speedily resolved and means for comparative analysis afforded.

OBJECT AND SUMMARY OF THE INVENTION

It is a principal object of the invention to provide methods and apparatus for the convenient study of strains imposed by practically any kinds of stress, including thermal, physical deflection, radiation, electrical pulsing, erosion, corrosion, chemical reaction or combinations of one or more of these. In addition, the apparatus is rugged in design, reasonable in cost of construction and maintenance, and amenable to automated control should this be desirable. Applicant's invention comprises a method and apparatus utilizing differential holography for article inspection.

The following description treats, as specific example, deformations induced by electrical activation in an animal muscle fiber, in this instance from a leg muscle of a frog; however, it will be understood that a practically unlimited number of materials and stresses can be evaluated by the same general techniques, oftentimes with no, or only minor, modifications.

BRIEF DESCRIPTION OF THE DRAWINGS

FIG. 7 is a schematic representation of a preferred embodiment of this invention, FIG. 8 is a schematic representation of part of the electronic circuitry embodied in the timing control mechanism of FIG. 7.

DETAILED DESCRIPTION OF THE INVENTION

Figure 1:
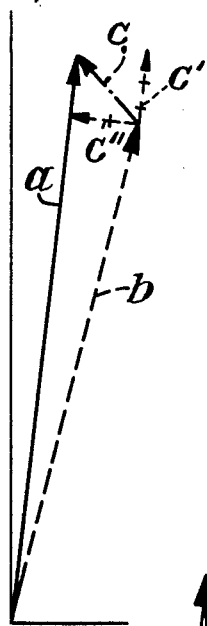
FIGS. 1-6, inclusive, are phasor diagrams depicting graphically optical magnitude relationships for the various modes of invention implementation.

This invention provides a double-exposure holographic interferometric system for visualizing small disturbances of an object in study and for discriminating between sub-microscopic disturbances, which occur in elements of the object at the limit of resolution in size, and other disturbances which may simultaneously be present which affect, in relatively homogeneous manner, portions of the object large enough to contain many elements.

The system utilizes an object-bearing beam and one or more reference beams of radiation coherent with the object beam which are conjointly brought to bear upon the detector. For the second exposure, the phases, or the phases and/or amplitudes of the beams are altered with respect to those that prevailed in the first exposure in a predetermined relationship which permits the construction of difference, of amplitude—or phase-biased differential, and/or non-differential images from the developed hologram. The design of the system makes it insensitive to errors of phase shift or to variations in the intensity of the radiation which might occur between the two exposures. A comparison of the images then permits the extraction of the disturbances of the optical phase and amplitude which result from the strain of any resoluble element of the object.

The system has the important capability of discriminating between changes in the opacity, changes in the index of refraction, and distortions of the contours of an object. (A corollary discrimination between macroscopic disturbances and fundamentally microscopic changes is thereby effected.)

In science and technology it is often of interest to determine the change in dimension, or in some other property, of an object subject to external stress, e.g., mechanical, thermal, electromagnetic, and others, or to endogenous change. A wide variety of gauges and meters have been devised, such as dilatometers, osmometers, the strain gage, current balances and others, each for a particular purpose. In many cases, however, changes in object image appearance constitute the most useful measures of change. The sensitivity with which such changes can be imaged depends primarily on the wavelength of the radiation used to form the image and on the numerical aperture of the imaging system. With the exception of interferometrically registered changes, the wavelength itself is the lower bound of relative displacements which can be detected. When interferometry is brought into action, the lower bounds are expressed in hundredths of a wavelength, or even in smaller fractions.

The application of holography to interferometry has brought such exquisite precision routinely to such measurements. Heretofore, the objectives of investigation have been, almost without exception, macroscopic, e.g., the deformation of a loaded beam or strut, the vibrations of a brake shoe or turbine blade, the distribution of fluid flow about an airfoil, and the shock waves created by the passage of a supersonic projectile. In such situations it is sufficient to measure the deformation of a surface, or to determine the alteration of optical path length along a given set of rays. The overall strain field can then be deduced by standard techniques of continuum mechanics as described, for instance, in *Holographic Interferometry* by C. M. Vest, Wiley Publishing Company, N.Y. (1979).

In contradistinction, other microscopic stress situations exist which demand in-depth investigation. Thus, a modern large-scale integrated circuit might develop highly localized thermal or electrical stresses not adequately anticipated in its design, and it could be essential to evaluate the effect of accompanying strains on individual circuit elements each only a micron or two in diameter. Or it may be desired to study, with interferometric resolution, the changes which occur in a living cell undergoing some natural process, for example the contraction of a single fiber of skeletal muscle. In such situations the diffractive properties of the subjects become important, rays lose their meaning, and micro-deformations of the subject might result in changes of opacity or turbidity as well as in changes in the index of refraction or distortion of boundaries or surface contours. Just as geometrical optics no longer provides a good description of the subject, so continuum mechanics no longer provides a proper description of its deformations. A point-by-point analysis of optical changes in the subject then becomes essential, and this cannot be achieved by means of the holographic interferometric techniques currently in use. Their inadequacy arises from their inability to discriminate sensitively, during reconstruction, changes in the amplitude of a subject wave from changes in its phase. The methods and apparatus of this invention do effect such discrimination.

The nature of the problem of discrimination will become clear from examination of FIG. 1. Here the complex amplitude associated with a point in the subject wave field is represented by means of a phasor in the convention taught by F. A. Jenkins and H. E. White, *Fundamentals of Optics*, McGraw-Hill, N.Y., 4th Ed. (1976) Chapter 12.

The complex amplitudes associated with the first and second subject waves are represented by the vectors a and b, respectively. The common point at which these waves are studied can be any point in space and can lie within a real or virtual image of the subject. The phasor arrows of FIG. 1 are unequal in length and differ in their inclinations with respect to the X and Y axes in the assumption that the wave corresponding to the first state of the subject differs both in amplitude and phase from that of the second state of the subject.

The two waves are holographed at separate instants of time on a common holographic emulsion, or other suitable detector. As is normal practice in holography, the two waves are reconstructed simultaneously. Two practices can be considered here. In the first, usual in the art, the reference wave used to holograph the first subject wave is identical with that used to holograph the second subject wave, in which case the complex amplitude corresponding to the simultaneous reconstruction of the two subject waves is represented by the vector sum of arrows a and b. In the second practice, the reference wave used to holograph the second subject wave differs from that used to holograph the first subject wave by a phase shift of 180 degrees; the complex amplitude that is then associated with the simultaneous reconstruction of the two subject waves is represented by the vectorial difference c, between vectors a and b, FIG. 1. This second practice I denote "difference holography." The holograms which it produces I call "difference holograms."

The techniques which my invention uses include difference holography as a special case; their effect is to make the reference wave used to holograph the second subject wave differ controllably, both in phase and in the integrated intensity of its exposure to the holographic emulsion, or other sensor, from that used to holograph the first subject wave. I have found it operable to employ reference wave phase shifts in the range of $-270$ degrees to $+270$ degrees as opposed to the fixed $+180$ degrees or $-180$ degrees of "difference holograms", and to employ shifts in the integrated intensity of the reference wave's exposure to the holographic emulsion, or other sensor, in the range of 50% to 150% of the base value of the integrated intensity, hereinbelow defined; and this technique I denote "differential holography." It will be seen, from the following description, that, in many instances, the features revealed in images made via difference holography cannot be well, or fully, understood except through recourse to images constructed via the special techniques of differential holography. Such images are hereinafter referred to as "differential images" except where they might equally well have been obtained by difference holography, in which case they will be called "difference images," or by ordinary double exposure holography.

Turning now to FIGS. 1-6 inclusive, these portray, in phasor representation, certain applicable optical relationships of radiation phase and amplitude as they exist in this invention, as applied to a muscle fiber in examination.

Thus, the complex amplitude associated with the simultaneous reconstruction of the two subject waves according to my practice, is represented by the vectorial difference phasor c between phasors a and b of FIG. 1. Phasor c has been resolved into the broken line components parallel and perpendicular to phasor a. These components, $c'$ and $c''$, respectively, represent the difference in amplitude and the difference in phase, respectively, between phasors a and b, and it is clear that these two differences are of approximately equal importance in determining the length of phasor c, the square of which latter's length represents the intensity of the difference image formed by the two subject waves.

Figure 2:
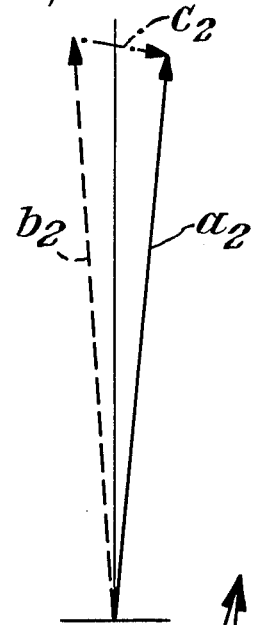

For comparison, a second set of subject waves, $a_2$ and $b_2$ is set out in FIG. 2. Here phasor $a_2$, identical with phasor a of FIG. 1., represents the same wave as before, while phasor $b_2$, representing the second subject wave, is now very slightly longer than $a_2$ and has a different phase angle than in FIG. 1. It is apparent, from FIG. 2, that the difference phasor $c_2$ is determined principally by the difference in the phases of the two subject waves. Nevertheless, the length of $c_2$, the square of which represents the intensity of the difference image, turns out to be exactly equal to that of c, FIG. 1, representing the very different situation where amplitude and phase differences were approximately equal in importance in creating the difference image. From this it is seen that it is impossible a priori or a posteriori to determine whether the residual intensity existing in a difference image results from a change in the phase of the subject wave (which would result from a motion of some macroscopic portion of the subject) from the change in the amplitude of the subject wave (which would result from sub-microscopic motion or reconfiguration within subject elements at the limit of resolution in size), or from some combination thereof [For a discussion of the limit of size resolution for images formed with light see pp. 330-4, Jenkins and White supra].

A set of approaches taken by this invention and sufficient to discriminate differences in amplitude from differences in phase between two waves compared in a difference image is set forth in items (a) through (d) below. It is to be understood that this set of approaches adheres to the known principles of linear holographic recording, according to which it is possible to choose the ratio of the amplitudes of the object and reference waves, the integrated exposure of the holographic recording material, or other sensor, and the length and/or type of development, or processing, of the exposed hologram to ensure that the amplitude of the subject wave normally reconstructed from the subsequently developed, or completed, hologram is proportional to the amplitude of the object wave to which the holographic recording material, or other sensor, had been exposed during the recording process. Had all of the aforementioned factors but integrated exposure been preselected, the "base value of the integrated intensity" is defined as that value of the integrated exposure to the reference beam of the said holographic recording material, or other sensor, during either of two identical, successive exposures, which maximizes the diffraction efficiency of the subsequently developed, or completed, hologram. For simplicity of description it is assumed that the choice of the units in which integrated exposure is measured is such that the base value of the integrated intensity is unity. In the following $\epsilon$, is a number such that $0 \leq \epsilon \leq 0.5$.

(a) During the exposure of the holographic emulsion, or other sensor, to the interference pattern of the reference wave and the first of the object waves compared, the integrated intensity of exposure to the reference wave is $(1+\epsilon)$ units, while during its exposure to the interference pattern of the reference wave and the second of the object waves compared, the integrated intensity of exposure to the reference wave is $(1-\epsilon)$ units. The amplitude-biased differential hologram formed by this procedure is hereinafter referred to as a "positively unbalanced hologram", and the image reconstructed therefrom is a "positively unbalanced differential image".

(b) During the exposure of the holographic emulsion, or other sensor, to the interference pattern of the reference wave and the first object wave, the integrated intensity of exposure to the reference wave is $(1-\epsilon)$ units, while during its exposure to the interference pattern of the reference wave and the second object wave, the integrated intensity of exposure to the reference wave is $(1+\epsilon)$ units, thus forming an amplitude-biased, "negatively unbalanced hologram" from which a "negatively unbalanced differential image" can be constructed. It will be understood that here, as in the positively unbalanced case, an increase of one-half wavelength is imposed upon the reference wave's optical path during the second exposure.

(c) The integrated intensity of each of the two exposures to the reference wave is unity; however, during the second exposure flash the optical path taken by the reference wave is preselected to be $(\frac{1}{2}+q)$ wavelengths longer than during the first exposure flash (where $0 \leq q \leq \frac{1}{4}$). The phase-biased differential hologram thus formed is referred to hereinafter as a "phase-advanced hologram" and an image reconstructed therefrom as a "phase-advanced differential image".

(d) The integrated intensity of each of the two exposures to the reference wave is again unity; however, during the second exposure flash the optical path taken by the reference wave is preselected to be $(\frac{1}{2}-q)$ wavelengths longer than during the first exposure flash. The phase-biased differential hologram and the reconstructed images resulting from this procedure are hereinafter denoted "phase-retarded".

In brief, procedures (a) and (b) are sensitive primarily to changes in the amplitude of the subject wave (i.e., varying as the first power of the difference of the amplitudes of the two subject waves) and, taken together, can determine both the amount and the sign of the change, whereas procedures (c) and (d) are sensitive primarily to changes in phase of the subject wave and, taken together, can determine the amount and the sign of the change of phase. Verification of the foregoing has been obtained by mathematical analysis, as elaborated in a private unpublished paper by applicant; however, the graphical analysis presented in the following FIGS. 3-6, inclusive, has been resorted to for clarity in the presentation.

Figure 3:
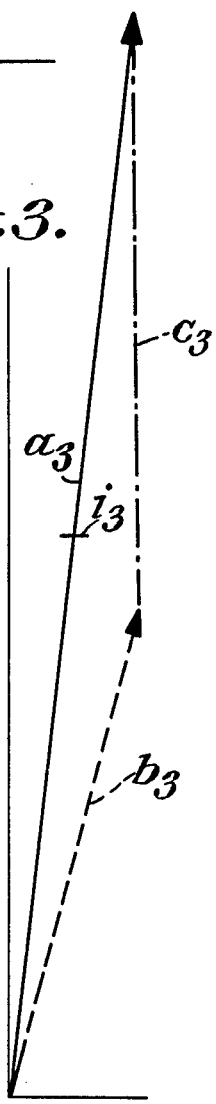

Referring to FIG. 3, there is represented a positively unbalanced image of the case depicted in FIG. 1. Because the hologram is exposed somewhat more intensely during the first exposure flash than during the second, the amplitude of the wave reconstructed from the first exposure is somewhat enhanced with respect to that constructed from the second exposure. (It is a known property of holograms recorded pursuant to the principles of linear holographic recording, which principles are adhered to in this invention, that the amplitude of the subject wave reconstructed from a developed hologram is proportional to the integrated intensity of the emulsion's, or other sensor's, exposure to the reference wave during the formation of the hologram.) In FIG. 3, this is represented by an increase in the length of phasor $a_3$, the original length of which (i.e., the length of phasor a, FIG. 1) is indicated, from the origin, by index mark $i_3$. Phasor $b_3$, identical with phasor b of FIG. 1, indicates that the second object wave is reconstructed with normal amplitude. The intensity of the positively unbalanced difference image here is proportional to the square of the length of difference phasor $c_3$. Changes in the appearance of the subject, represented by the length of phasor c of FIG. 1, are now partially overshadowed by the ghost replica image of the quiescent subject, represented by the large extension in the length of phasor $a_3$, FIG. 3. (By "ghost replica" is meant the faint image that would appear even if the object had remained perfectly static during the holographic procedures.)

Figure 4:
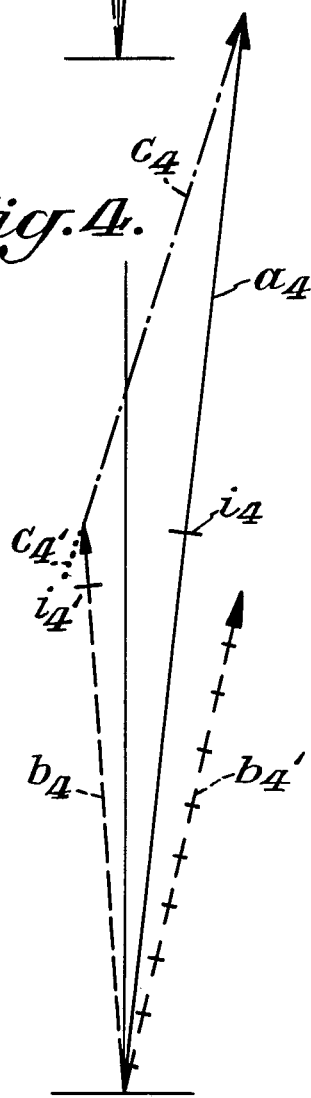

Referring to FIG. 4, this bears an analogous relationship to that of FIG. 2. The index mark $i_4$ on phasor $a_4$ again indicates the length appropriate to reconstruction from a difference hologram, and the extension of the overall length of the phasor $a_4$ over $a_2$, FIG. 2, the enhancement in reconstruction amplitude produced by the relatively strong first exposure flash. Phasors $b_4$ and $b_4'$, correspond to phasors $b_2$ and $b_3$, FIGS. 2 and 3, respectively, and index mark $i_4'$, denotes the length of $b_4'$, as measured from the origin. The intensity of the difference image is proportional to the square of the length of phasor $c_4$. This latter is now shorter than phasor $c_3$, and the difference in their lengths, indicated by extension $c_4'$, is very nearly equal to the difference in the lengths of phasors $b_4$ and $b_4'$, even though these two phasors point in very different directions. FIGS. 3 and 4 illustrate the fact that the intensity of a positively unbalanced differential image is strongly dependent upon the change in the amplitude of the subject wave, and practically unaffected by changes in its phase.

A similar analysis shows that the same conclusion applies to a negatively unbalanced differential image. The positively unbalanced image differs from the negatively unbalanced one, however, in a very important respect, namely: if the amplitude of the second subject wave happens to be larger than that of the first subject wave, then the negatively unbalanced differential image will be brighter than one constructed from a negatively unbalanced hologram of the subject held in its first condition. And the positively unbalanced image will be dimmer than the positively unbalanced image of the subject in its first condition. If, on the other hand, the first subject wave has an amplitude larger than that of the second, the opposite deviations will prevail. The positively unbalanced image will then be brighter than a positively unbalanced control image in which the subject remains in the first state, and the negatively unbalanced differential image of the changing subject will be dimmer than in a negatively unbalanced control image of the subject held in its first state. Thus, by comparison of positively and negatively unbalanced images of the changing subject with positively and negatively unbalanced control images of the subject kept in its unstressed state, the sign as well as the magnitude of the amplitude change at each point in the image can be determined. Actually, only one type of control image need be constructed, since the method of forming the unbalanced holograms gives reconstructed images which, when the subject is static, are identical in intensity.

It is critical to this invention that the method of constructing the amplitude-biased holograms ensures that their integrated exposures are essentially identical, and that their diffraction efficiencies are essentially equal, so that the prediction of the mathematical (and graphical) analysis is closely realized in practice.

Figure 5:
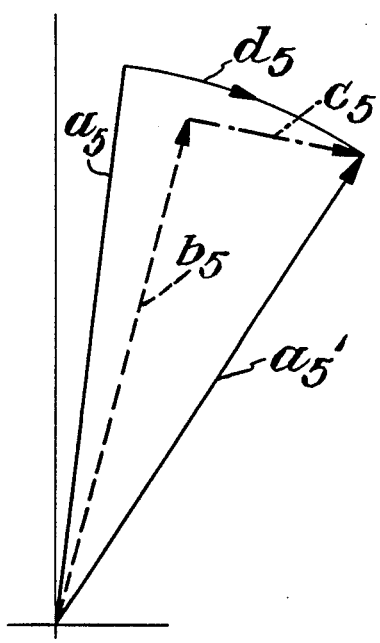

Referring to FIG. 5, there is represented a phase-retarded differential image of the case depicted in FIG. 1. The phase of phasor $a_5$, which represents the reconstructed first subject wave, has been altered because the reference wave experienced an effective phase shift $+q$ during the first exposure flash. Phasor $b_5$ represents the reconstructed second subject wave as unaffected by this process. The alteration in the phase of the reconstructed first wave is indicated by the arrowed circular arc $d_5$. The intensity of the differential image is proportional to the square of the length of phasor $c_5$.

Figure 6:
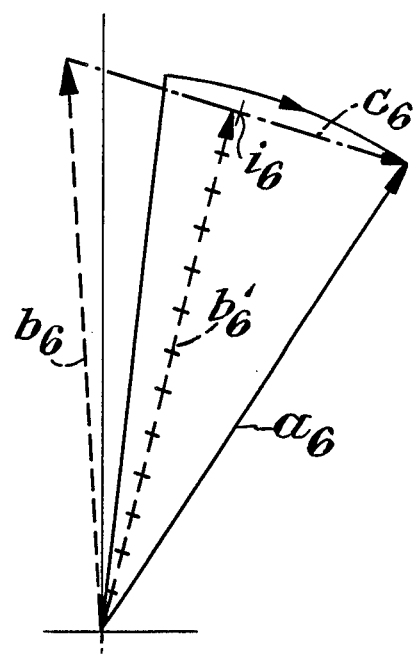

Referring to FIG. 6, the phase-retarded situation corresponding to the case of FIG. 2 is represented. The dotted arrow $b_6'$, indicates the length and direction of phasors b and $b_5$ of FIGS. 1 and 5, respectively, and the index mark $i_6$ which transects $c_6$ indicates the length, read to the right from the tip of phasor $b_6$, of phasor $c_5$ of FIG. 5. The difference between the length of phasor $c_6$, FIG. 6, and $c_5$, FIG. 5, will be reflected by a substantial difference in the intensities of the two images. It is apparent that the difference between these phasors's lengths is determined primarily by the difference in the phases of phasors $b_5$ and $b_6$. Thus FIGS. 5 and 6 illustrate the fact that the intensity of a holographic phase-retarded differential image is strongly dependent upon changes in the phase of the subject wave and practically unaffected by changes in its amplitude.

A similar argument applies to phase-advanced differential images. And analogous arguments show that signs as well as magnitudes of phase shifts can be determined by a comparison of the intensities of phase-advanced and phase-retarded differential images of a dynamic subject with either the phase-advanced or phase-retarded control image of that subject held in its first (unstressed) condition.

It is also critical to this invention that the method of constructing the phase-biased holograms ensures that their integrated exposures are essentially identical, and that their diffraction efficiencies are equal, so that the prediction of mathematical (and graphical) analysis is closely realized in practice.

In summary, the following six types of holograms are obtainable with this invention:
 (1) non-differential holograms (or images)
 (2) difference holograms
 (3) positively unbalanced holograms
 (4) negatively unbalanced holograms
 (5) phase-advanced holograms
 (6) phase-retarded holograms By employing subtractive comparison of wavefronts, it is practicable to achieve visual detection of fringe shifts as minute as 1/500 fringe. However, such precision is attainable only by maintenance of the optical surfaces of the components (FIG. 7) such as beam splitter 10, mirrors 11 and 12 and beam expander 44, and holographic plate or sensor 7 in stable positions within about 0.001 wavelength during the overall exposure of the holographic plate or other sensor. Similar control of optical wedges 19 and 20 with respect to mirrors 12 and 11, respectively, is essential. The necessary mechanical stability is obtained by robust construction of optical mounts and compact component arrangements. The mounting of components upon a sandwich of metal honeycomb coated with acoustically absorbing material is also helpful, as is location of the apparatus in a reasonably vibration-free site.

The practical attainment of the foregoing precision implies also that the configuration of the wavefronts of the reference wave be tightly controlled during the overall exposure of the holographic plate 7. It is therefore desirable that the laser 3, typically an argon ion laser emitting green light of wavelength 514.5 nm operate in a single mode, preferably gaussian ($TEM_{oo}$) in transverse profile. For similar reasons, beam expander 44, consisting of lenses 45 and 46 in sequence, is provided with a pinhole aperture 47 for spatially filtering away the wavefront irregularities caused by convection noise in laser 3 and from dust particles in the space traversed by the reference wave.

To minimize the effects of frequency drift, or mode hopping, in laser 3, it is prudent to make the reference and object optical paths equal to within a few thousand wavelengths and to shield them against strong convection currents in the ambient air. Such precautions are fairly standard in routine holography; however, they are truly essential in this invention.

Highly sensitive detection of small amplitude- or phase-changes in the object wave requires highly precise exposure control. The signal/noise ratio and the brightness of a holographically reconstructed wave or image are closely dependent on the diffraction efficiency of the developed holographic emulsion. For any given emulsion a latitude of exposure of approximately ±2X, equivalent to ±one photographic stop, can be tolerated in ordinary holography. For conventional holographic interferometry the visual or photographic fringe contrast would not be noticeably reduced if the two exposures were unequal by 10–15%. In contrast, for holographic difference interferometry it is necessary to control the two exposures to within about 1%.

Because the intensity of the laser beam drifts and fluctuates, a simple setting of the lengths of shutter openings will not usually suffice. Instead, it is advisable to integrate the intensity of the laser beam and to close the shutter when the integral has attained a preselected value. For exposures of about 1/50 sec. or longer, the electronically controlled focal-plane shutter of some types of automated 35 mm. single lens reflex cameras might be used. Servo-controlled electromechanical leaf shutters of appropriate design suffice for exposures longer than about 10 msec.

For shorter exposures, an electro-optical or acousto-optical beam polarizing or deflecting device, equipped with an appropriate polarizing filter or beam stop, can be used. Because such devices pass appreciable light even when nominally switched off, their preferred function should be as clippers of the 100% on/off pulses passed by an ordinary photographic shutter. When extremely short pulses are required, two or more electro-optical or acousto-optical devices can be ganged in cascade to improve the on/off contrast ratio during the interval over which the photographic shutter is open. Alternatively, the laser could have pulsed operation.

Referring now to FIG. 7, laser 3 is a continuously operating type sending a radiation beam 4 into a shutter 5, which is a conventional electromechanical leaf shutter type, typically, a Vincent Associates Model 26, provided with an acousto-optical Bragg diffractor, typically, an Intra-Action Corp. Model AOM-40. The signals which control the shutter openings are generated by a clock circuit (refer FIG. 9) which can be actuated manually or by computer control.

Following the shutter, beam 4' proceeds to variable beam splitter 10, typically a Jodon Engineering Associates type VBA-200, which divides it into beams 8 and 9 directed along different paths. Beam splitter 10 is preferably of a design permitting reset to vary the relative intensities of beams 8 and 9 while constraining them to their accurate paths at all times.

Beam 8 is redirected by full reflection mirror 11 as beam 23, passing through optical wedge 20, which back-reflects a portion of the radiation to mirror 11 and thence through variable beam splitter 10 and concavo-concavo lens 36 which projects it onto an opaque plate 39 provided with an aperture 64 having a diameter typically 0.1 interference fringe spacing.

Beam 23 proceeds to the object, which constitutes the dynamical subject of scrutiny, e.g., a muscle fiber, magnetic tape, or integrated circuit chip. Referring to FIG. 7, a transparent object is illuminated by condenser 24 and the light transmitted, refracted, diffracted, and/or scattered by the object 25, hereinafter called the "object wave", is then collected by the optical apparatus denoted generally at OA. This apparatus may be a process lens or the image-forming optics of a microscope including objective and eyepiece lenses (preferred embodiment) and optionally equippped, if desired, with phase-contrast, interference-contrast, modulation-contrast and/or polarizing or other optical processing device. Similarly, the condenser 24 may be equipped with phase-, interference-, or modulation-contrast fittings and/or polarizing devices and may produce bright-field, oblique bright-field, or dark-field illumination of the object, as desired. It is also possible to impinge light beam 23 directly upon the object 25 without employing the condenser 24.

Figure 7A:
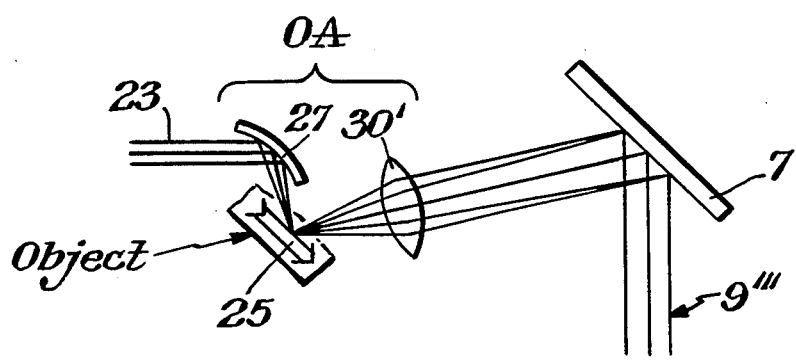
FIG. 7A is a detail schematic of a preferred optical arrangement which can be employed as a substitute for that shown in FIG. 7 for reflectance examinations of opaque samples according to this invention.

The embodiment shown in FIG. 7 is preferred for the examination of the full volume occupied by an object which is highly transparent, such as a fiber of skeletal muscle. When interest is directed mainly at the superficial aspect of an object (e.g., the surface layer) it will often be preferable to carry out the examination by reflected light rather than by transmitted light. This will be particularly true for objects which are not highly transparent, as is the case for magnetic tape and for many kinds of semiconducting materials, and the devices constructed therefrom. An object illumination and object wave collection and transmission embodiment preferred in such cases is depicted schematically in FIG. 7A, which shows the radiation beam 23, identical to that occurring in FIG. 7, deflected and condensed upon the object 25 by means of the concave mirror 27. Light reflected and/or scattered by the object is gathered by the optical apparatus denoted generally at 30', which may be any of the types already mentioned in connection with FIG. 7, and sent on to holographic plate 7 which is conjointly illuminated by radiation beam 9''' identically as in FIG. 7. It is understood that the deflection hand condensing functions combined by the mirror shown at 27 can be performed separately by two or more optical elements and that the element which serves as condenser can be equipped with supplementary fittings as hereinbefore described with reference to FIG. 7. It is also practicable to omit the condenser element and impinge the deflectd beam directly upon the object.

After transmission by 30, the object wave is routed to the optical sensing system, represented in FIG. 7 as holographic plate 7, although it can be a vidicon tube or other device if preferred. If 7 is a holographic film or plate, it is desirable to position it at the exit pupil of the device 30. Such positioning, where possible, minimizes holographic exposure times and maximizes the amount of the image space accessible to scrutiny during holographic reconstruction of the object wave.

Beam 9 is reflected by mirror 12 and transmitted to partially reflective optical wedge 19 where a portion of the radiation is reflected as beam 32 and a second portion is reversed in course along beam 9, and redirected back to variable beam splitter 10 via mirror 12. Here it is partially reflected as beam 33. A portion of radiation 23, back-reflected by optical wedge 20, which is of the same design as optical wedge 19 hereinbefore described, is reflected back via mirror 11 and partially transmitted through beam splitter 10, combining with radiation 33, with which it is coherent, and interfering therewith. It is advantageous, though not essential, that the optical paths from the optical wedges 19 and 20 to beam splitter 10 be equal within 25,000 wavelengths.

The radiation interference pattern is expanded by lens 36, and transmitted via aperture 64 to square law photodetector 63 (typically a photodiode) generating an electrical signal which is routed, via line 40 to control apparatus hereinafter described which in turn controls piezo-electric translator (PZT) 50, typically, a Jodon Engineering Associates Model ED-25, upon which mirror 12 is fixedly mounted.

Beam 9" is expanded by beam expander 44 and directed, as reference wave 9"', at the region of the holographic plate (or sensor) 7 illuminated by object wave 23'. Radiation 32 is detected at square-law photodetector 54, typically, a conventional photodiode from which an electrical signal is derived via line 52 which controls the lengths of the shutter 5 openings as hereinafter described.

The clock and adjustable timing circuits 53 are conventional components, in parallel and in cascade, of monolithic semiconductor timing devices (chips) of type 556 (Signetics, Inc). The chip which comprises the clock is wired for astable operation and causes the train of voltage waveforms generated by the remaining chips, which are wired for monostable operation, to be periodically executed. The transmission of these waveforms to the apparatus shown elsewhere in FIG. 7 is controlled by switches which are actuated manually or, optionally, electronically. The lengths of the timing cycles of the individual chips are set by resistors in the usual manner, with variable resistors used in the cases of the several cycles whose lengths are variously changed from one set of preselected values to another.

The typical disposition of waveforms with respect to one another is indicated by the waveforms A, B, and C, of FIG. 7, where it is understood that the horizontal axis is time. The amplitudes of waveforms B and C are adjustable by means of variable voltage dividers included within the device 53, while the waveform A is, in essence, a pair of logic pulses. The amplitude of PZT drive waveform B is set manually with the help of the interference pattern viewed by photodetector 63 as explained hereinafter; optionally, electronic or computer-controlled setting is practicable. The amplitude of the waveform C employed to stress or stimulate the object 25 is set manually or, optionally, electronically, as dictated by experimental procedures which are not part of this invention.

For facilitating understanding of the invention, the following description of the apparatus of FIG. 7-12, inclusive, is combined with explanation of the operation.

Thus, referring to FIG. 7, the recording of a difference hologram of the dynamic system would proceed as follows. The clock and adjustable timing circuit, indicated generally at 53, generate electrical signals that initiate and control the entire system, signaling shutter 5 to open and causing piezoelectric translator 50 to shift the position of mirror 12 so that the optical path 9, 9' is one half wavelength longer (or, optionally, shorter) during the second shutter opening than during the first. (It will be understood that the same practical effect can be achieved by fixing mirror 12 and moving mirror 11 so that the optical path 8, 23 is one-half wavelength shorter (or, optionally, longer) during the second shutter opening than during the first, or, in fact, by displacing both mirror 12 and mirror 11 so as to obtain an equivalent change in optical path length 9, 9', 9''' minus optical length 8, 23 and 23'.

The photocurrent generated at photodetector 54 (PDI, FIG. 8) is integrated by operational amplifier 57 (FIG. 8), and the integral is compared against a reference value in a comparator 58. The comparator output is a logical negative when the integral has not yet reached the reference value and a logical positive when the integral attains the reference value, or exceeds it. The comparator's logic level is communicated via line 60 to NAND gate 61. The second input to 61 is provided by the logic pulses of waveform A, FIG. 7, which are communicated to it along line 62. The output of NAND gate 61 will be (logical) positive if the logic levels in either or both of lines 60 and 62 are negative. This is the situation which obtains before the first shutter pulse of waveform A arrives and which continues, with the pulse present, until the comparator 58 signals that the integral of photocurrent from PDI, 54, as integrated by 57, has achieved the preset value. At that instant, the output of the comparator becomes logically positive and the output of NAND gate 61 drops to zero (i.e., logical negative). This state exists until the end of the first shutter pulse of waveform A, when the output of 61 must then become logically positive again. The falling portion of the first shutter pulse triggers a reset of the integrator, by conventional circuitry, not shown. The sequence initiated by the second "shutter on" logic pulse of waveform A is exactly like that just described for the first "shutter on" pulse. The falling portion of the second "shutter on" pulse actuates reset of the integrator, thus preparing it, and the logic circuitry dependent upon it, for the arrival of the next waveform A.

The "shutter-on" pulses and the output of NAND gate 61 control the integrated exposure of the holographic plate 7 (FIG. 7) to the reference beam 9''' as follows. The "shutter on" pulses are used to control, via line 67, the electromechanical portion of shutter 5, which is open when, and only when, one of the pulses of waveform A is present on line 62. The output of NAND gate 61, suitably amplified, is made to control the intensity of the acoustic waves in the acousto-optical modulator portion of the shutter 5. When the output of NAND gate 61 is zero, these waves have zero intensity and the acousto-optical modulator does not function as a Bragg diffractor. The acousto-optical modulator is then "off", so far as the passage of beam 4' through to the rest of the apparatus of FIG. 7 is concerned. At all other times, the modulator is "on", even at those times when the electromechanical portion of shutter 5 is off. Thus the rising portion of each of the "shutter on" pulses of waveform A opens shutter 5, while the appearance of logical zero at the output of NAND gate 61 turns it off, i.e., "clips" its opening acoustooptically, even though the mechanical component of the shutter remains open by itself. The intensity of the laser beam 4, FIG. 7 is set at a level sufficiently high that such clipping action always occurs. This is verified by means of the oscilloscope CRO, 69, of FIG. 7, which receives both the unclipped "shutter on" logic pulses of waveform A and the clipped shutter actuation waveforms observed via beam 33 at photodetector 63 (FIG. 7). These waveforms are conveyed to CRO 69 along lines 40 and 67, respectively.

The operation of the circuitry of FIG. 8 as just described, ensures that the integrated photocurrents from photodetector 54, and hence the integrated intensities of exposure of holographic plate 7 to reference wave 9''', to which they are proportional, will be equal. This is the normal operation during the recording of a difference hologram, for which recording the reference value supplied, as hereinbelow described, to comparator 58 is preselected to ensure that the integrated intensity of each of the two exposures of the holographic plate 7 to reference wave 9''' equals the base value of the integrated intensity. As described above, the optical path 9, 9', 9'', 9''' is one-half wavelength longer during the second shutter opening than during the first. Should the object remain static during the interval encompassing these exposures, the fringe pattern holographed during the second exposure has exactly the same form and intensity as that holographed during the first exposure, except that all the fringes bright during the second exposure will correspond with those that were dark during the first exposure, and vice versa. The normally developed holographic plate 7 will therefore appear uniformly black, and no interference fringes will remain to diffract light during a reconstructive illumination by reference beam 9'''. Had the integrated exposures achieved during the two exposure flashes differed in value, an interference fringe pattern of low contrast will be created on the developed holographic plate 7. During holographic reconstruction, a weak replica of the static object wave is produced. According to the principles of linear holographic recording, a discrepancy of 1% in integrated exposures gives rise to an object wave $(0.01)^2/4 = 1/40,000$ as intense as that obtained from a hologram formed without moving mirror 12 between exposures.

Since some holographic emulsions are capable of producing a signal/noise ratio (i.e., a reconstructed image intensity/intensity of flare light where "flare light" is light that is randomly scattered as a result of the granularity of the developed holographic emulsion) of 40,000 or greater, exposure control to within about 1% is required if the full dynamic range of such emulsions is to be utilized in differential holography.

Similar considerations apply with respect to the optical paths, that is, if these shift by more than $0.01/2\pi$ wavelength from the design value of 0.500 wavelength, the "difference" image of a static object will exceed 1/40,000 the intensity of a non-differential image formed with the same exposure intensities. Hence control of the relative positions of the optical surfaces to within 0.001 wavelength is required for full utilization of the full dynamic range of the emulsion.

The arrangement of components in FIG. 7 makes the control of optical path shift relatively simple, the wave 9, 9' experiencing a shortening of path both during its forward travel and during its backward travel to mirror 12. The attainment of precisely one-half wavelength of optical path shift of the reference wave corresponds to a shift of precisely one fringe in the interference pattern viewed by detector 63. The verification that this condition has been attained is easiest if the optics are arranged so that the aperture 64 ahead of detector 63 lies about midway between a bright fringe and a dark fringe. Because the position of this "demarcator" is read by electronic and/or oscilloscope means (e.g. 69), it is possible in practice to determine that a fringe shift is integral to within 2 parts/thousand.

This same method can be used to detect and analyze vibrational problems which occur from time-to-time in the apparatus. One merely affixes a microscope cover slip with beeswax to the suspect component, letting the cover slip play the role of optical wedge 20 in the Michelson interferometer effectively formed by optical wedge 20, mirror 11, optical wedge 19, mirror 12 and beam splitter 10. Thus, even components of a very bulky optical system can be checked for vibrational stability at 0.001 wavelength level.

The apparatus of FIG. 7 can be used with only slight modification to produce positively or negatively unbalanced holograms, or phase-advanced or phase-retarded holograms. In the latter two cases the drive voltage of PZT (piezo-electric translator) 50 is reset with the help of detector 63, so that the optical interference fringe shift at 63 is $2(\frac{1}{2} \pm q)$ fringes in the appropriate direction, the exposure flashes being controlled to be of equal energy.

In the case of amplitude-biased holograms the fringe shift at detector 63 is maintained at 1.000 fringe during the second exposure flash, but the reference value fed to the comparator 58 of the integrated exposure photocurrent (FIG. 9) is preselected to be different during the second exposure than the first. The interchange of reference values is accomplished with the help of simple logic circuitry. Referring to FIG. 8 the reference level for comparator 58 is derived by adding a suitable, preselected DC voltage to the output of NAND gate 98. When the switch 99, whose position is preset manually or, optionally, by computer control, is open, the output of NAND gate 98 will be logically positive because no signal will be present in line 100. This is the situation maintained during the recording of difference holograms or phase-biased holograms, when the comparator's reference level must be the same for both exposure flashes. When it is desired to make the reference value different for the second exposure than for the first, so that the exposure flashes will be unequal in their energies, the switch 99 is closed before the arrival of waveform A. A counter circuit within counter + logic apparatus 101 then reads waveform A at the same time that it is being supplied to the NAND gate 98.

When counter 101 has registered the arrival and disappearance of the first "shutter on" pulse, the logic element within apparatus 101 supplies a prolonged logical positive voltage to line 100. The arrival of the second "shutter on" pulse on line 67, causes NAND gate 98 output to drop to zero (logical negative) during the entire duration of this pulse. This change in the output of gate 98 is conveyed along line 104 via series-connected voltage source 105 (typically, 4V) to comparator 58, which will then accomplish its function before the logical positive at the output of gate 98 has been restored. The logic level in line 104 is made to return to zero before the arrival on line 67 of another waveform A from the clock and timing circuits.

The interchange of reference voltages to comparator 58, as just described, corresponds to some fixed value of the number $\epsilon$. In my practice I have found it desirable to vary the preselected value of $\epsilon$ within the aforementioned range of $0 \leq \epsilon \leq 0.5$. For this purpose a variable voltage divider of conventional form is permanently inserted (but not shown in FIG. 8) between the output of NAND gate 98 and line 104. The fraction of the output voltage of NAND gate 98 supplied to line 104, and thence to comparator 58, may then be altered, from time to time, by readjustment of said variable voltage divider. Each time the said readjustment is made, a corresponding readjustment is made to the voltage of series connected voltage source 105, the effect of which coordinated readjustments is to ensure that the sum of the integrated intensities of the two exposures to the reference wave of the holographic plate, or other sensor, is twice the base value of the integrated intensity. The determination of the settings of said variable voltage divider and said series voltage source actually required to achieve this condition is typically made by replacing the dynamical subject of scrutiny by a calibrated photographic step chart, disconnecting the line which conveys waveform B to the PZT 50, and making a series of test holograms. The subject waves reconstructed from said test holograms are made to form images of said photographic test chart which are compared, in brightness and in fidelity of reproduction of steps, with the original. In this way both the linearity of the recording process and the diffraction efficiency of each of the developed test holograms is monitored, permitting the determination of said settings of said variable voltage divider and said series voltage source.

This is the situation when positively unbalanced holograms are made: the reference voltage supplied to comparator 58 is higher during the first of the "shutter on" pulses than during the second. For the recording of negatively unbalanced holograms the reference voltage supplied to comparator 58 must be made higher during the second of the "shutter on" pulses than during the first. This is accomplished by arranging the logic element of apparatus 101 to provide logical positive to line 104 *until* the counter has verified that the first of the "shutter on" pulses is complete.

If the dynamic system behaves in a demonstrably reproducible manner from test cycle to test cycle, the apparatus of FIG. 7 will suffice to trace out the alteration with time of its optical characteristics. (In amplification, by resetting the stimulus timing in relation to the timing of the second exposure of the holographic plate one can make a set of holograms which will show the response of the object at different instants of time subsequent to the disturbance.) With the same apparatus, it would, of course, be practicable to combine amplitude unbalance with phase retardation in situations where such combination is desirable. It will be understood, also, that the shift in reference path length, object path length, alone or both, can be accomplished electro-optically rather than electromechanically. A PZT-driven mirror 12 is preferred for this function because it does not distort the wavefronts whose phases are being shifted. Mirror 12 should be of interferometric quality, as should the other surfaces which are used in setting up the interfering beams, FIG. 7.

Figure 9:
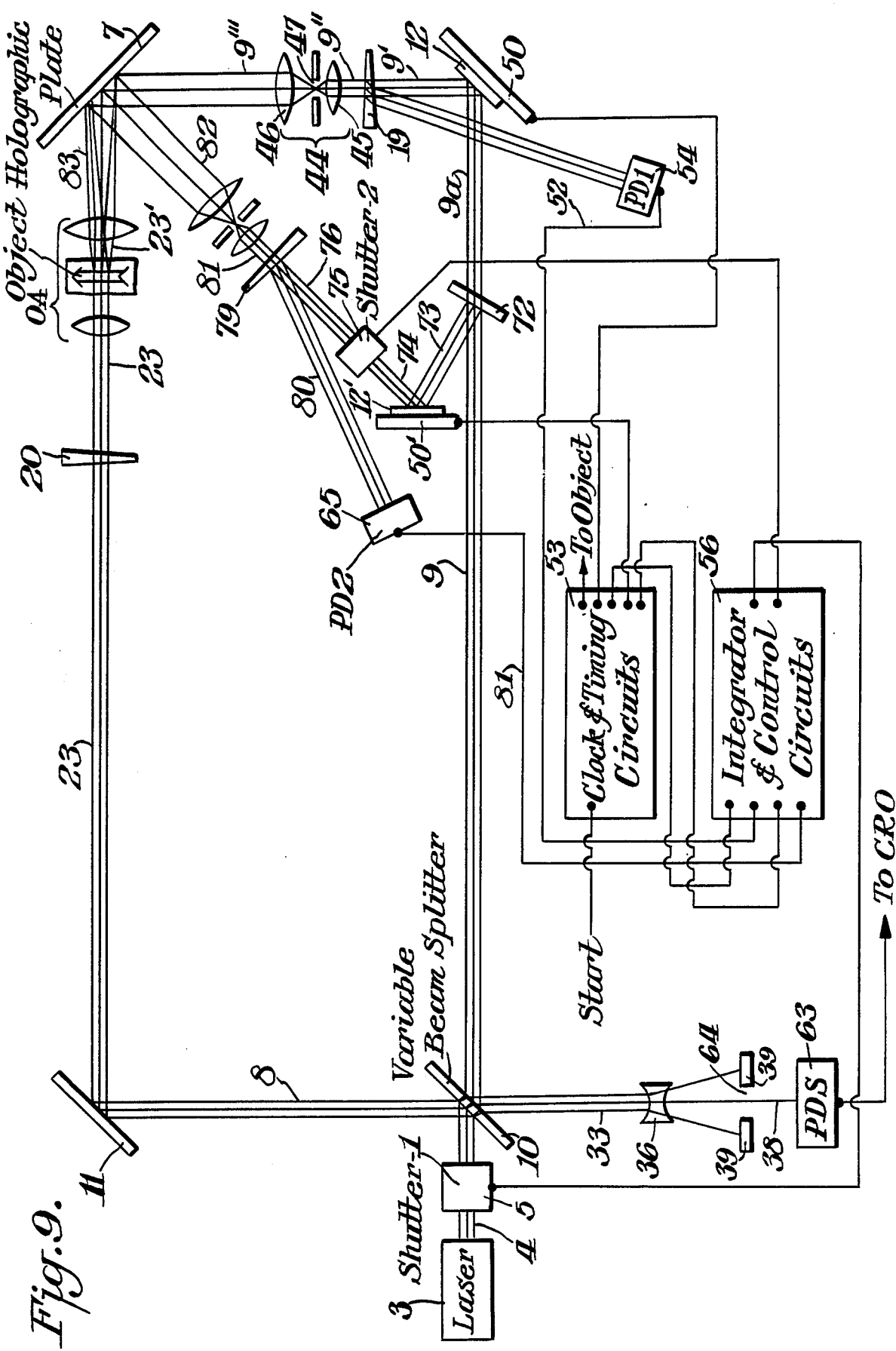
FIG. 9 is a block diagram of a second embodiment of apparatus according to this invention permitting simultaneous recording of object holograms.
Figure 10:
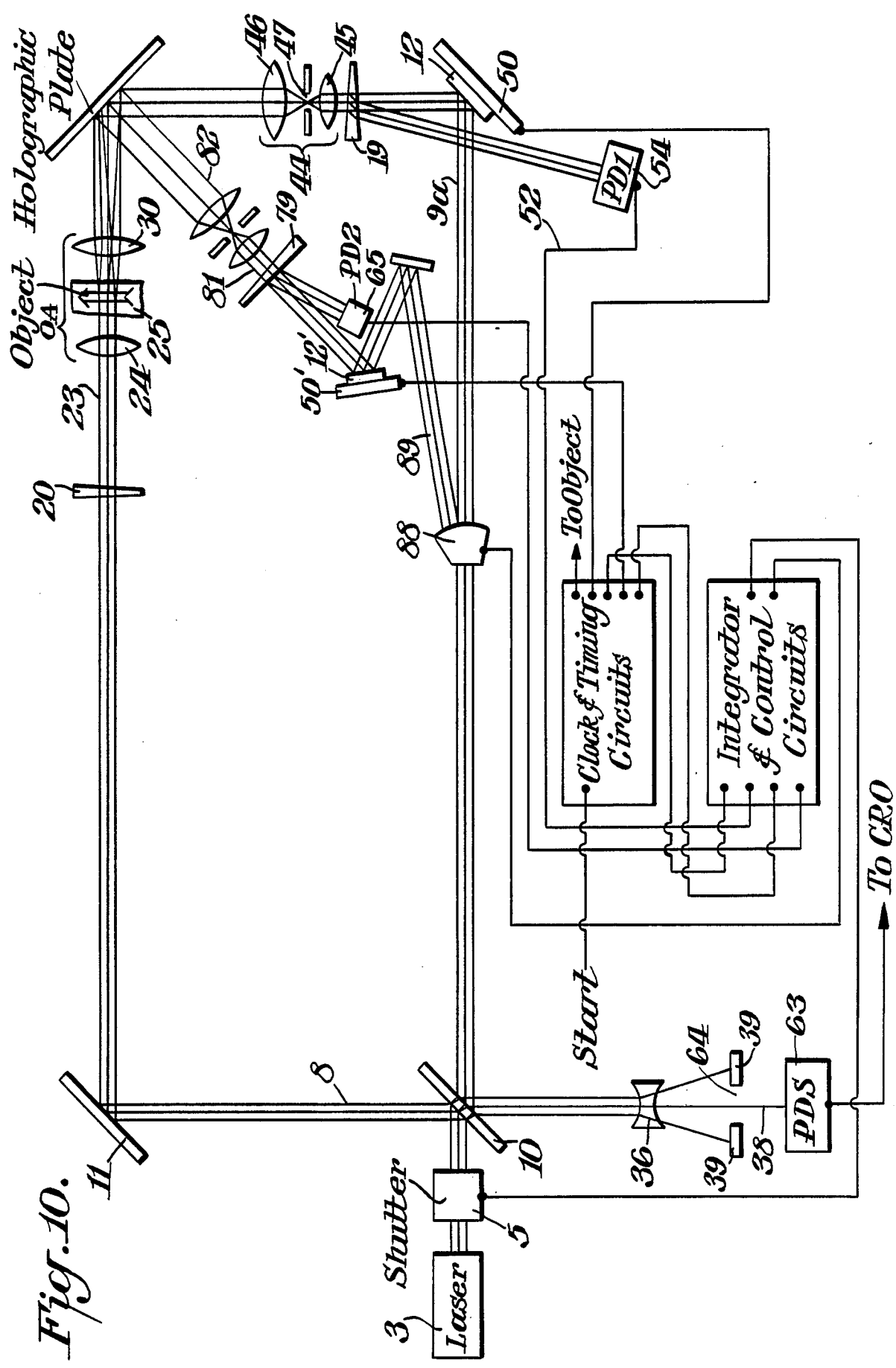
FIG. 10 is a block diagram of an apparatus patterned after that of FIG. 9, but permitting the sequential recording of object holograms, or simultaneous recording.

When the dynamic system under examination does not exhibit reproducible behavior from test cycle to test cycle, it is still practicable to record, simultaneously, holograms of all the types hereinbefore described, and FIGS. 9 and 10 depict preferred ways of accomplishing this, identical reference numerals being employed for counterpart components.

Referring to FIG. 9, beam splitter 72, typically, a Jodon Engineering Associates Model VBA200, reflects a preselected fraction of beam 9 into beam 73, which is reflected at PZT translator 50' mirror 12' subassembly into beam 74, which is controlled, as beam 76, by shutter 75. Beam 76 is directed to transparent wedge 79 which retroreflects a portion of beam 74 radiation at one surface and reflects a second portion of beam 74 at the other surface. The retro-reflected portion of 74 travels backwards on courses 74 and 73, and the portion which is partially reflected at beam splitter 72 travels back along course 9 and, after reflection by variable beam splitter 10, joins beam 33. The interference fringes formed by this part of beam 33 with the portion reflected from the object path via optical wedge 20 can be used to control the displacement of mirror 12' in exactly the same way as hereinbefore described for mirror 12 in FIG. 7. A beam absorber, e.g., a light-absorbing plate, placed temporarily in radiation path $9_a$ facilitates proper adjustment of the voltage waveform applied to PZT 50'. The drive for PZT 50 is similarly brought into adjustment, the beam absorber being then inserted temporarily in the path 73.

The beam 80 is detected by photodetector 65 and a signal derived which is transmitted via line 96 which is used to control shutter 75 by the techniques hereinbefore described for shutter 5.

The beam 81 transmitted via optical wedge 79 is expanded by beam expander 44' and directed as a second reference beam 82 to overlap the area of the holographic plate also illuminated by the object beam 83. Reference wave 9''' remains directed toward this identical area of holographic plate 7.

Shutter 75 is held continuously open, and PZT 50' is disconnected from its driving source. Shutter 5 is controlled to produce two exposure flashes equal in integrated intensity. PZT 50 is driven in the manner normally employed to produce difference holograms. The interference fringe patterns formed by the object wave 83 and the reference wave 9''' during the second shutter opening will then be subtracted from that formed during the first opening. The interference pattern formed by object wave 83 and reference wave 82 during the second shutter opening will then merely be added to that already created during the first opening. In the developed holographic plate, the fringe patterns formed with beam 9''' correspond to a difference hologram, while those formed with beam 83 correspond to an ordinary hologram of the same object wave(s). Pursuant to the principles of linear holographic recording, illumination of developed plate 7, positioned as it was during recording, by beam 9''', alone will then produce a difference image of the object, while illumination by beam 82 alone will produce an ordinary holographic image or interferogram of the object as it was during the same instants of time compared in the differential image.

The embodiment of FIG. 9 can be made, with little change, to produce simultaneously a phase-advanced and a phase-retarded hologram of the dynamic system. In this case shutter 75 is left continuously open while PZT 50 is made to produce an optical path shift of $(\frac{1}{4}+q)$ wavelengths in reference wave 9''' at the same time that PZT 50' is made to produce an optical path shift of $(\frac{1}{4}-q)$ wavelengths in the reference wave 82. Successive illumination of the developed hologram with each of these two reference beams acting singly produces phase-advanced and phase-retarded difference images of the dynamic system at the same instants of object motion.

When the object is maintained static (i.e., unstressed) proper adjustment of the relative intensities of 9''' and 82 will ensure that the two control images have exactly the same intensities. The recording technique guarantees that the images will have the same location.

The foregoing teachings apply to the simultaneous recording of positively and negatively unbalanced holograms. In the latter case the shutter 75 is utilized and PZT 50 and PZT 50' are each set to shorten the optical paths 9a, 9', 9'', 9''' or 73, 74, 76, 81, 82, respectively, by ¼ wavelength. Shutter 5, controlled by the light incident on PD 54, is driven so that the integrated intensity in beam 9''' is greater by a factor $(1+2\epsilon)$ during the second exposure flash than during the first. Shutter 75, controlled by the light incident on photodetector PD2, 65, is driven so that the integrated intensity in beam 82 is smaller by the factor $(1+2\epsilon)$ during the second exposure flash than during the first. In order to accomplish this, the openings of shutter 75 have to be shorter than for shutter 5, and so the beam splitter 72 will have to provide more intensity for beam 82 than for beam 9'''. By properly setting their relative intensities, it can be ensured that, during reconstruction, the intensity of the positively unbalanced control image of the static object is exactly the same as that of the negatively unbalanced control image. The two images will, of course, occur at the same location. The fact that the object beam illuminates the emulsion during portions of the exposure in which wave 82 is shuttered off is of no importance under the conditions of linear recording.

It is clear from the foregoing that the apparatus of FIG. 9 is sufficiently flexible to permit simultaneous recording of any pair of the several types of hologram so far described. It will be understood that additional reference beams and control circuits can be added to the FIG. 9 embodiment so that three or more of the six types of images hereinbefore described can be simultaneously recorded if desired. Thus one or more additional beam splitters could be inserted in light paths 9 or 8, or both, and additional reference waves derived by a straightforward duplication of the arrangement which has been described for the second wave 82. The reference wave optical paths should be arranged so that they are all equal in length to the object optical path length plus or minus 50,000 wavelengths.

Referring to FIG. 10, there is shown a modified design of the FIG. 9 apparatus wherein the functions of beam splitter 72 and shutter 75 are both assumed by a conventional acoustical Bragg diffractor 88. Again, the same reference numerals employed in FIG. 9 are employed in FIG. 10 for identical components.

A Bragg diffractor is provided with a transparent (e.g., optical glass) medium in which acoustic waves are set up piezoelectrically or in some other manner. The amplitudes of these acoustic waves, and hence the amplitudes of the variations in refractive index which they produce, are a function of the amplitude of the electrical signal supplied to the piezoelectric transducer coupled to the transparent medium. The modulation depth or thickness of the optical phase grating which results is thus under control, and with it the distribution of optical intensity among the diffracted orders. It is thus possible to both control and modulate the distribution of the intensity of beam 9 into beams 9a and 89. Thus, if PD 54 is made to control the openings of shutter 5, PD 65 can be used to direct and to modulate during exposure the division of intensity between beams 9a and 89, and hence between 9''' and 82. Thus, the apparatus of FIG. 10 can perform all the functions performed by the apparatus of FIG. 9. The same is true if PD 65 is used to control shutter 5 and PD 54 to control the operation of acoustical Bragg diffractor 88. It will be understood that additional Bragg diffractors and/or beam splitter-shutter combinations can be deployed together with the apparatus described to record simultaneously any desired number of the six hologram types in a common region of holographic plate.

The apparatus of FIG. 10 has a capability beyond that of the FIG. 9 apparatus in that holograms of any one type, or of mixed types, can be recorded sequentially rather than simultaneously. Thus, in the situation of a dynamic system whose behavior changes as a consequence of the test procedure, it can be desirable to make a holographic differential movie of the object wave. This can be readily accomplished by providing additional optical reference paths in the manner hereinbefore described in conjunction with logic circuits which sequentially switch full intensity radiation from one reference path to the next. The movie would be reconstructed by returning the developed holographic plate to its original emplacement. The logic circuitry switches reference intensity sequentially from one beam to the next, and the reconstructed images, each representing a comparison of two states of the object, are sequentially flashed to the same location in space.

The apparatus of FIG. 10, suitably expanded by provision of additional reference beam paths, can also be used to make movies, for example, of positively unbalanced difference images and phase-advanced difference images simultaneously. In such a case the total number of reference paths would be 2N, where N is the number of frames preselected for any one movie. The logic circuitry would then be designed to control pairs of reference beams simultaneously, and to switch sequentially from one pair to the next in the series of N.

As is the case in conventional holography, the images of concern can be real or virtual, depending upon the desiderata of the particular test performed. When the optical system OA is an image-forming device, it is often convenient to focus it so that a real image of the system under test is formed in a plane beyond the holographic plate 7. The reconstructed image, or movie, can then be photographed lenslessly. This may be particularly advantageous when OA is a compound microscope.

Some applications of differential holography involve the simultaneous use of two or more wavelengths of light in the recording and reconstruction processes. In biology and medicine a specific dye is often employed to monitor one or a small subset of many physiological processes, themselves simultaneously of interest and under study, which occur in the object under examination. In the study of muscular contraction, for example, whose onset is very strongly controlled by free calcium ions in the myoplasm, it can be desirable to monitor the spatial distribution of the concentration of free calcium in a single muscle fiber at the same time that the spatial distribution of its mechanical activation is being studied. Differential holography provides a means of carrying out both observations simultaneously, achieving during the process all the spatial resolution of which the optical apparatus OA is capable. A metallochromic dye, such as antipyrylazo III, is injected into the fiber before the holographic exposures are carried out. The absorption spectrum of this dye changes quite substantially with concentration of free calcium ions over the range that this concentration varies in muscle. Difference and/or differential holograms made with light of a wavelength lying within the metallochromic absorption spectrum of the dye will then sensitively reveal changes in calcium concentration when they are reconstructed. The contribution of mechanical activation to such holograms can be sorted out when additional difference and differential holograms are made with light whose wavelength lies outside the metallochromic absorption spectrum of the dye, which will reveal only the optical changes associated with mechanical activity of the muscle fiber.

Holograms of these two types can be recorded simultaneously and yet reconstructed independently of one another, as hereinafter explained.

It is known in the holographic art that waves from several different subjects can be recorded simultaneously in a common region of a single holographic recording medium. If the reference waves against which these subject waves are made to interfere, in forming their respective holograms, are not coherent with one another, and if the recording medium is sufficiently thick, it is possible to reconstruct from the developed hologram each of the subject waves individually, without reconstructing any portion of any of the others. The aggregate exposure of the holographic recording medium must be chosen so that the developed hologram operates in the linear region of its transmission response curve. When this is achieved, the subject wave desired is reconstructed when the developed hologram is illuminated alone by the reference wave against which that subject wave had been made to interfere. In practice, a thickness of 10-20 wavelengths in the recording medium is sufficient for the effect to be practically achieved. A hologram recorded in this way, and having sufficient thickness, is herein referred to as a "thick hologram". The properties of thick holograms permit the simultaneous recording and independent reconstruction of a set of subject waves each having a wavelength different from all the others. The reference wave made to interfere with any subject wave must be of its same wavelength. The extension of this principle to the case in which one or more of the simultaneously recorded subject waves is used to form a difference or differential hologram is part of this invention.

Figure 11:
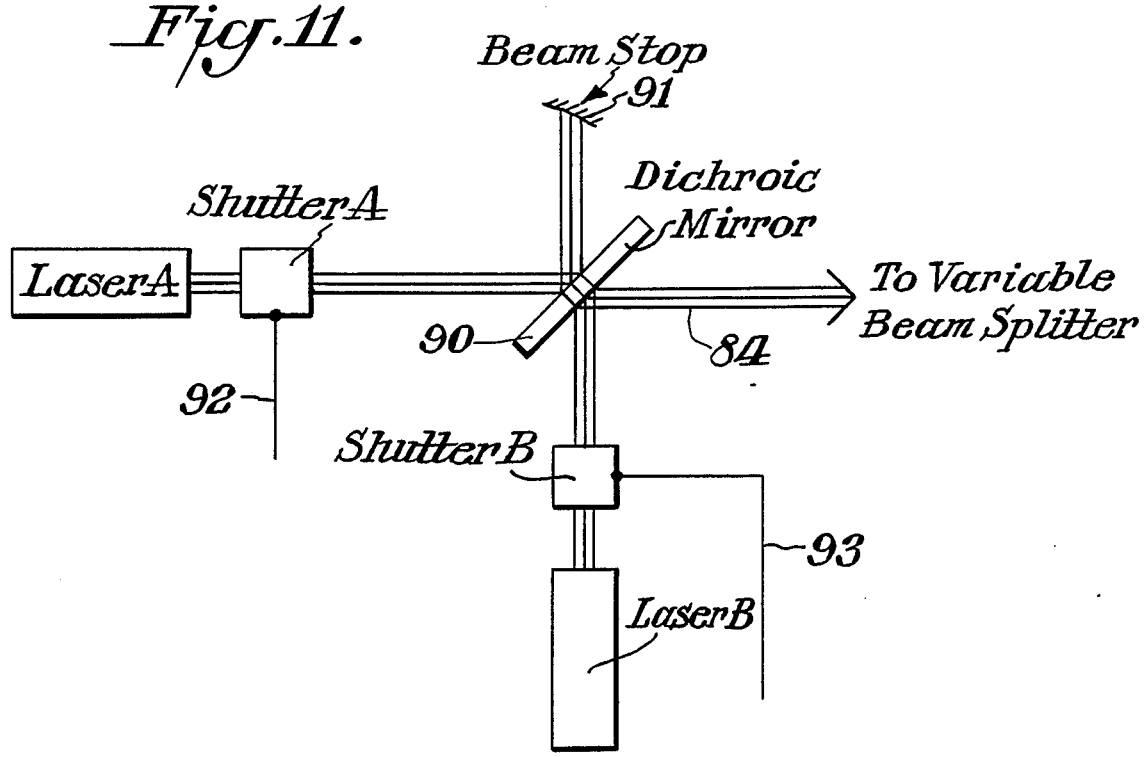
FIG. 11 is a detail block diagram of an embodiment of apparatus according to FIG. 10 utilizing two lasers of different preselected wavelengths adapted to construct difference images in two colors either simultaneously or alternately.
Figure 12:
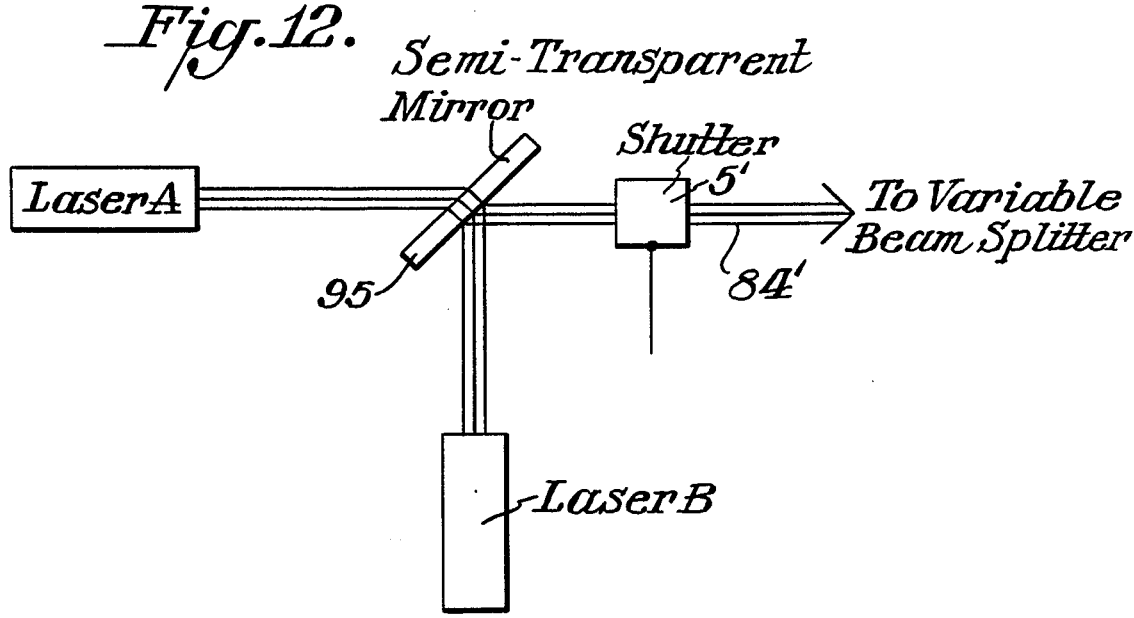
FIG. 12 is a detail block diagram of an embodiment of apparatus according to FIG. 10 utilizing two lasers in association with a semi-transparent mirror instead of the dichroic mirror of FIG. 11, FIG. 13, A-D, are photographic reproductions of differential and non-differential holographic images of a muscle fiber in stress and relaxed states respectively, FIG. 14, A-D, are photographic reproductions of (A) differential holographic images of a resting (unstressed) fiber pair, (B) difference image of the stressed fiber pair, (C) positively unbalanced differential image of the fiber when stressed as in (B), and (D) negatively unbalanced differential image of the fiber when stressed as in (B) and (C), FIG. 15, A-D, are photographic reproductions of phase-biased holographic images of the same fibers as in FIG. 14, made under the same illumination and focus, but 2.0 msec. later in the contraction cycle, and FIG. 16, A and B are photographic reproductions of holographic images of a fiber viewed via a 40X water immersion objective, N.A.=0.75, focused on the upper edge of the fiber in (A) the differential mode and (B) the non-differential mode of the same region of the fiber.
Figure 13A:
Figure 13B:
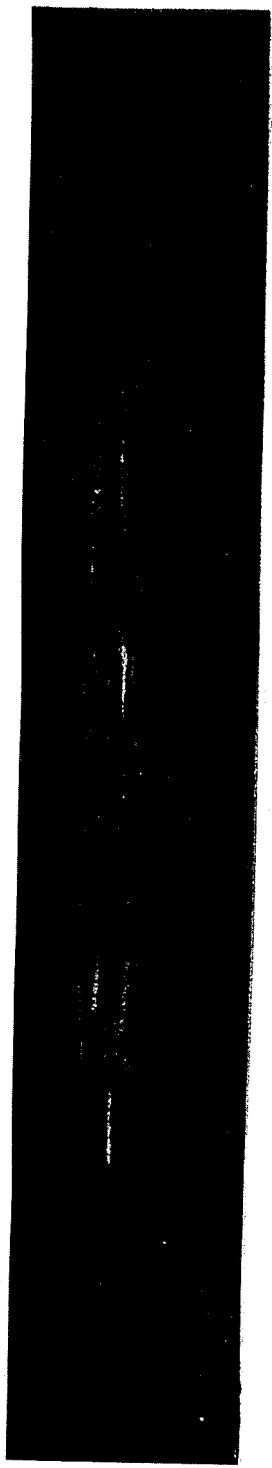
Figure 13C:
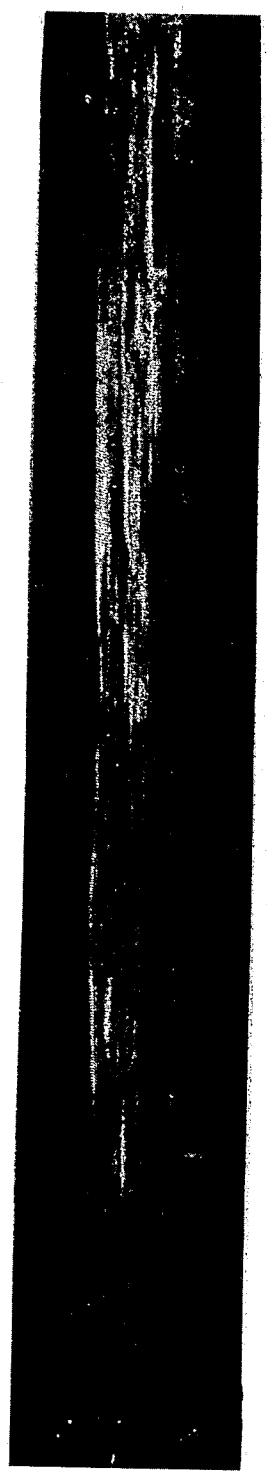
Figure 13D:
Figure 14A:
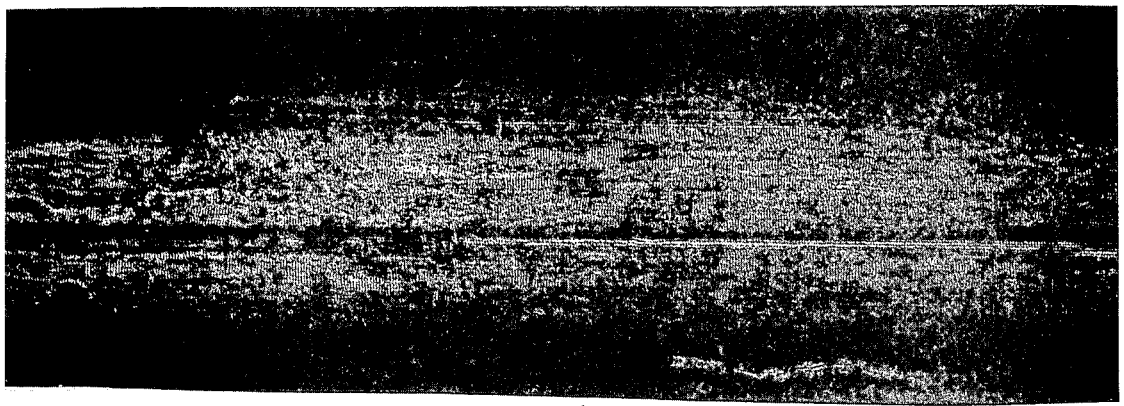
Figure 14B:
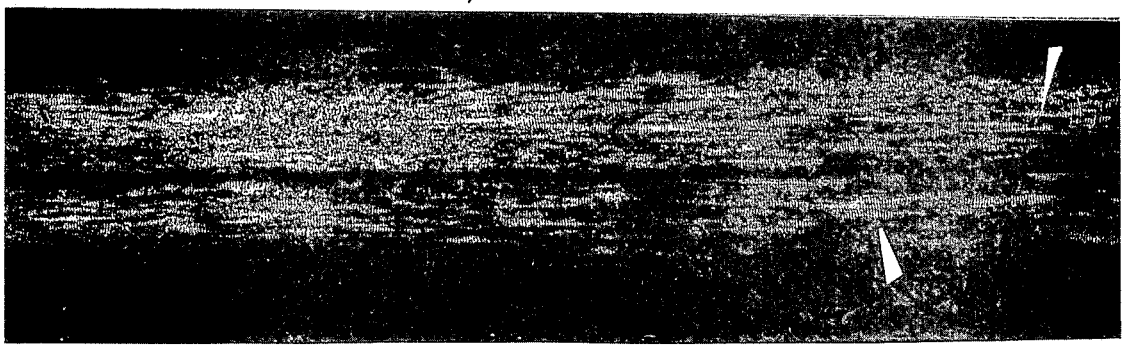
Figure 14C:
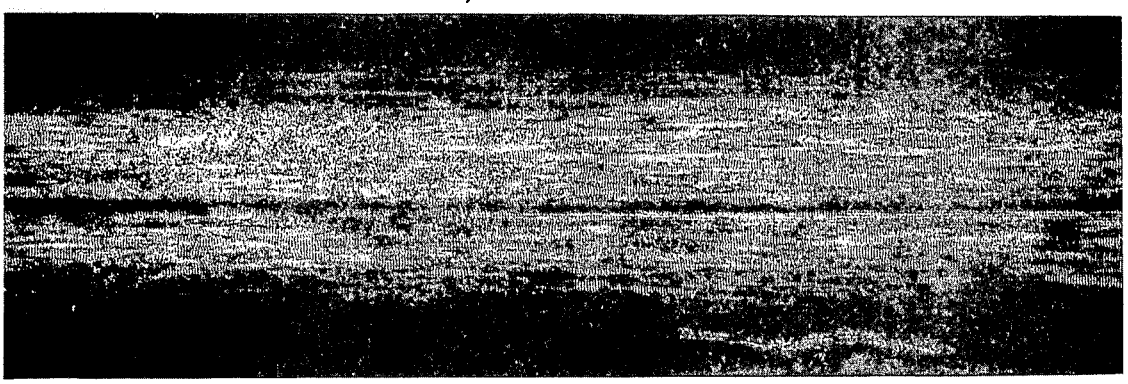
Figure 14D:
Figure 15A:
Figure 15B:
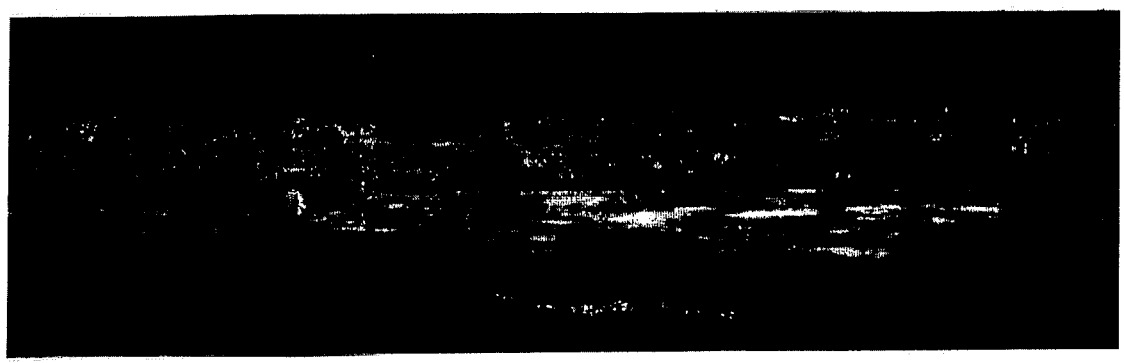
Figure 15C:
Figure 15D:

Apparatus capable of recording two differential holograms simultaneously, each at a different wavelength, is not much more elaborate than already shown in FIG. 10. FIGS. 11 and 12 are detail drawings which indicate how the beams produced by two separate lasers A and B, which emit light of wavelength $\lambda_A$ and $\lambda_B$, respectively, can be combined and made to impinge simultaneously and collinearly upon a beamsplitter used, as 10 in FIG. 10, to create object and reference beams which follow separate paths. In FIG. 11, a preferred embodiment, the separately shuttered lasers A and B are adjusted in position and in orientation, by conventional means, so that when the shutters A and B, respectively, are open, the beam of wavelength $\lambda_B$, preferentially reflected by the dichroic mirror 90, is collinear with the beam of wavelength $\lambda_A$ which the dichroic mirror preferentially transmits. The combined beam, containing both wavelengths, is then substituted for beam 4' of FIG. 10. The portions of the beam of wavelength $\lambda_A$ reflected, and of the beam of wavelength $\lambda_B$ transmitted by the dichroic mirror 90 are intercepted at the beam stop 91, which may be a light-absorbing metal plate, and thereby screened from the rest of the apparatus. The shutters A and B, are driven separately by a pair of the shutter control mechanisms hereinbefore described with reference to FIGS. 7 and 10 via electrical lines 92 and 93, respectively. In FIG. 12, a less preferred embodiment, the lasers A and B play the same roles as in FIG. 11. Dichroic mirror 90 is replaced by a semi-transparent mirror 95, more readily available but less economical of laser light, and the functions of the shutters A and B of FIG. 11 are performed by the single shutter 5' which controls the combined beam, exactly as described in connection with shutter 5', FIG. 7.

The processing of the combined beam by the apparatus of FIG. 10 is similar to that described earlier, in connection with monochromatic operation, except in one important respect. In FIG. 10 Bragg diffractor 88 is arranged to diffract into a first order beam only one of the two wavelengths present in the combined beam. The remaining wavelength passes through the Bragg diffractor substantially unaffected by the acoustic waves existing therein, which do not satisfy the Bragg condition for the second wavelength. If the Bragg diffractor is adjusted so that the Bragg condition is met for wavelength $\lambda_A$, this wave will be diffracted into path 89 with continuation through optical wedge 79, ultimately becoming reference wave 82. The wavelength $\lambda_B$, not diffracted, continues along paths 9a, 9', 9'', 9''', ultimately becoming reference wave 9'''. The beam 8 reflected by 10 is processed exactly as before, and thus the object wave 83 which impinges upon the holographic plate 7 contains both wavelengths. The photosensor PD2, 65, formerly used in the control of the Bragg diffractor's division of intensity between the beams 9a and 89, now is used to control shutter A, FIG. 11, while photosensor PDI, 54 is used to control the opening periods of shutter B, FIG. 11. The integrated intensities of exposure of the hologram to the two reference waves are thus brought under simultaneous control. The adjustment of the voltages of the waveforms which drive the optical path shifters PZT 1, 50, and PZT 2, 50', are made as hereinbefore described, it being understood that the shifters are adjusted with the help of the beams whose wavelengths are those of the intended operation.

When the embodiment of FIG. 12 is employed to produce the combined beam 84' which substitutes for 4', FIG. 10, separate control over the integrated exposures of the holographic plate to each of the two reference beams is lost. The arrangement is practical, then, only where differential holograms of one and the same type are to be produced at both wavelengths by the apparatus. In this case the shutter 5' of FIG. 12 can be driven from circuitry supplied by photosensor 54. Photosensor 65 then can be kept inoperative.

The apparatus of FIG. 7 was employed to obtain the following photographs of FIGS. 13 through 16.

In FIG. 13 appear photographs of four holographic images of a muscle fiber. The images were made with the apparatus and methods hereinbefore described, the optical apparatus OA of FIGS. 7, 9, and 10 being a microscope having a 10X/0.30 objective and a 4X eyepiece. The laser beam 23 was impinged directly on the fiber. In A, the fiber remained at rest (unstressed) during the conventional double exposure holographic recording process. B, C, and D are difference images of the fiber at rest during the first, and undergoing contraction (i.e., stressed) during the second exposure of the holographic plate, a galvanic stimulus (such as a low voltage pulse transmitted via lead 42, FIG. 7) which elicited the contraction having been delivered 3, 4, and 6 msec before the second exposure, respectively. The exposure flashes were each ¼ msec long, and the second exposure in B occurred at the very onset of the contractile tension measured by a strain gauge attached to one end of the fiber. The fiber surround which is bright in A is completely dark in B, C, and D in consequence of the holographic subtraction of the object waves; this and the dark portions of the fiber itself represent regions of the object whose optical characteristics are the same during both exposure flashes. The bright areas of these images represent the regions of the object where optical changes did occur, and the following describes the nature of the processes which caused the changes. One of these processes, the gross motion which occurs during contraction, can clearly be discerned in the imaging of the seven blood corpuscles which may be seen adhering to the surface of the fiber in A (refer arrows), four at the extreme right and three at the upper left. In B these corpuscles do not appear, in C they appear weakly, and in D they each appear imaged doubly and brightly. Because B, C, and D are, in effect, successive time lapse images of a contraction, a clear interpretation of the appearance of the corpuscles is possible. Between the exposure flashes of D, the entire fiber has undergone differential motion through distances large in comparison to the diameter of a corpuscle. The doubled images of each of the three corpuscles at the left are spaced by a common distance, which is itself larger than the common distance which separates the doubled images of each of the four corpuscles at the extreme right. Evidently the fiber has contracted in the direction of its own length during the interval between exposures. In C, the relatively weak imaging of each of the corpuscles betokens its displacement through a distance which is yet small in comparison with the corpuscular diameter. In B the fact that the corpuscles do not appear indicates that they underwent no displacement between the exposure flashes.

A question exists whether gross motion was not, similarly, the origin of the bright longitudinal structures visible within the space occupied by the fiber in B and, subsequently, in C and D. Differential holography, in the sense of this invention, is essential in providing a negative answer. In FIG. 14 are shown three unbalanced differential images, all made with $\epsilon=0.15$, and a difference image of a pair of fibers from a same type muscle as used in FIG. 13. A is a positively unbalanced control image of the fibers at rest, and the bright object at the bottom right center is a wisp of cotton which adhered to the lower fiber throughout the experiments. Negatively unbalanced control images of the fibers were visibly indistinguishable from this image, in accord with expectation. In the remaining images, the fibers were stimulated galvanically 3 msec before the second exposure flash. C and D are positively and negatively unbalanced differential images, respectively; B is a differential image. As in the case of FIG. 13, the images which appear in FIG. 14 were photographed and printed under conditions common to all. The absence of the wisp of cotton from the image B shows that the fibers were not in motion during the holographic recording of B, C, and D. The longitudinal structures which appear in B (arrows) are brighter and perhaps more readily visible in C than they are in B itself, in spite of the fact that their surround has brightened in C in consequence of the unbalanced holographic exposure flashes. Many of these structures are invisible in D; where they do appear at all, they are dimmer than in either C or B. The discussion hereinbefore relating to FIGS. 1-6, as applied to the images of FIG. 14, indicates that the waves associated with (or scattered by) these structures have a smaller amplitude when the fibers begin to contract (i.e., are stressed) than when the fibers are at rest (unstressed).

The reduction of scattering amplitudes associated with the onset of contraction is quite severe, amounting to approximately 30%, as may be judged by the nearly complete destructive interference between the waves of the longitudinal structures and the ghost image of the passive portion of the fiber evident in FIG. 14 D. Such reduction evidences the occurrence of macromolecular rearrangements on a submicroscopic scale, and the spatial distribution of such rearrangements, when viewed in the framework of the microstructure of muscle, provides insight into the way in which muscular contraction is initiated.

The use of phase-biased holograms in the description of the dynamics of the onset of muscular contraction is illustrated in FIG. 15, where are shown three phase-biased images, obtained with $q=1/16$, and a difference image of the fiber pair shown already in FIG. 14, but now stimulated 5 msec before the second exposure flash. The illumination and the photographic conditions were unchanged from those of FIG. 14, and the bright structures visible in the difference image B therein are yet more brightly visible in the difference image B, FIG. 15. The wisp of cotton adhering to the lower fiber is visible in the latter image, indicating that the fibers have undergone motion between the exposure flashes. A question exists to what extent the brightness of the features of FIG. 15 B arise from such motion, and to what extent from the submicroscopic processes responsible for their appearance in FIG. 14. Amplitude-biased images made as in FIG. 14, but under the same stimulus timing as here in FIG. 15, show that the submicroscopic processes contribute about as much to the brightness of the features of FIG. 15 as they did to those of FIG. 14. The distribution of brightness in FIG. 15 can, with this knowledge, be analyzed to indicate the extent of longitudinal motion. The analysis proceeds from comparison of the phase-retarded and phase-advanced images of the contracting fibers, FIGS. 15 C and D, respectively, with the difference image B. (A is a phase-advanced image of the fibers at rest.) It is seen that all the longitudinal features in the image of the lower fiber of C are brighter than in B, the more so in the left half of the fiber than in the right, as may be seen by comparing features which in B are comparable to each other in brightness. Similarly, except for those on the extreme right, the longitudinal features of the lower fiber in D are dimmer than in B. The most prominent of the longitudinal features at the extreme right of the lower fiber are of very nearly the same brightness in all three of B, C, and D. Hence they are nearly at rest. The magnitude and direction of the motion of the remaining portions of the lower fiber can be determined from the wavelength and the direction of the laser beam incident upon the fibers. Illumination was in a plane containing the longitudinal axis of the fiber pair and the perpendicular to the plane of the photographs, making an angle of 10° with the latter, and directed upward towards the left. The total displacement of the bright filaments near the center of the lower fiber thus works out to be about 0.17 $\mu$m, directed towards the right.

The longitudinal features which occur in the differential images of FIGS. 13-15 do not appear identifiable, as they stand, with known microstructure of muscle fibers. Indeed, most of these features are not recognizable in the control images of the resting fibers. However, the fact that the average index of refraction of myoplasm is quite different from that of typical physiological saline solutions used to bathe muscle material causes substantial refraction at the boundary between a muscle fiber and its surround. This refraction causes spherical aberration and astigmatism to occur in the formation of any image of the muscle fiber. These effects can be largely removed if enough protein is added to the bathing solution to bring its index into match with the average index of the fiber. The result is a marked improvement in the clarity of images made of the fiber.

Figure 16A:
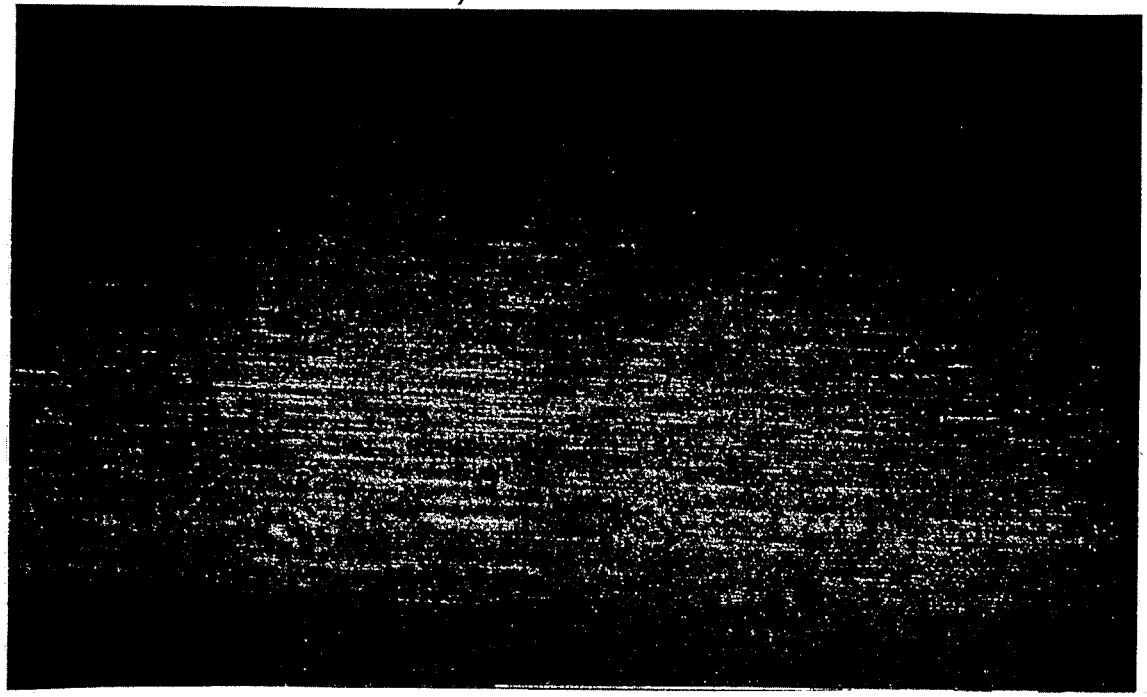
Figure 16B:
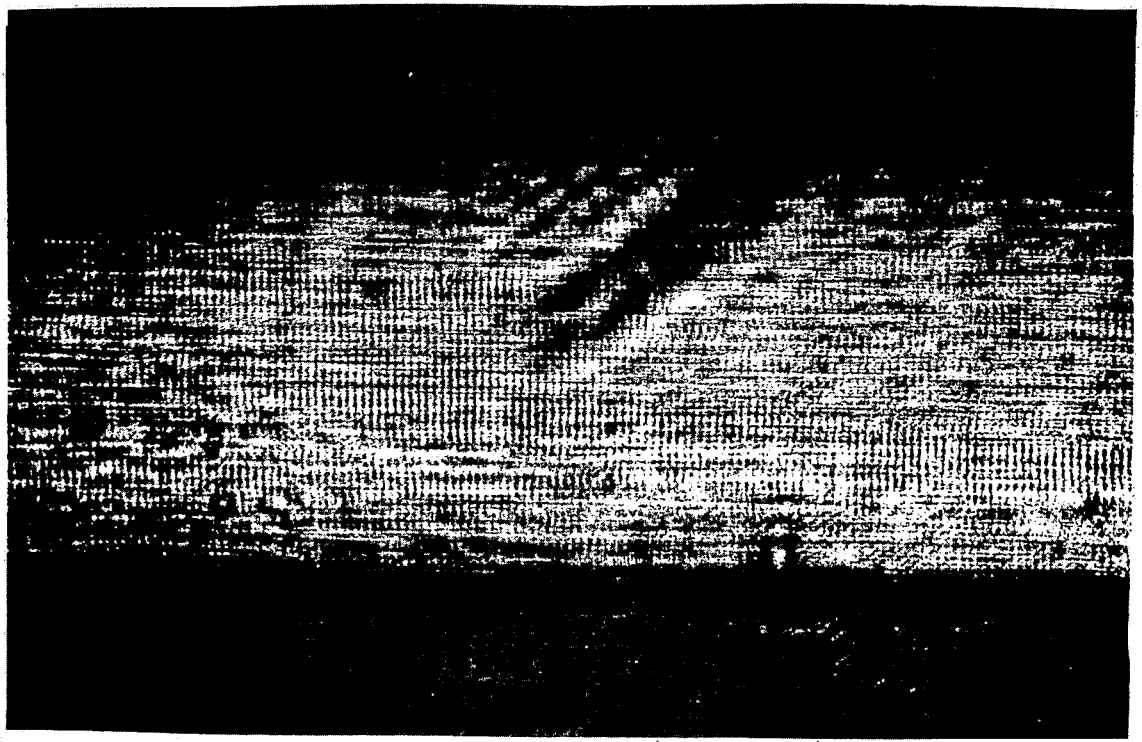

Holographic images of a fiber bathed in nearly index-matching solution are shown in FIG. 16. B is a nondifferential image which shows the characteristic cross-striation (bright vertical lines) of skeletal muscle. The microscope used in the recording process carried a 40X/0.75 water immersion objective whose resolving power was sufficient to show the myofibrils, which appear in the FIGURE as narrow, bright horizontal lines which lie parallel to the fiber axis. The diameters of myofibrils are known from several lines of evidence to lie, approximately, within the range 0.3–1 μm. FIG. 16, A is a difference image of the same portion of the fiber shown in B, made at the same point during contraction as the images in FIGS. 13 and 14. The bright horizontal lines of A are well-formed images of the structures which are responsible for the longitudinal structures of FIGS. 13 and 14, and it may be seen that, in FIG. 16, these structures are congruent with portions of the myofibrils of the fiber. It is found in unbalanced differential images of this fiber, not shown here, that the bright regions of the difference image A do indeed result from the reduction of optical scattering amplitudes which accompanies mechanical activation.

Thus, differential holography brings a heretofore unachieved power to the analysis of the dynamics of microscopic structures.

It will be understood that this invention can be practiced with a wide variety of radiation types, whether in the form of monochromatized and coherent beams (1) of charged or uncharged particles (e.g., electrons, neutrons, protons, atoms or positive or negative ions), or (2) in the form of acoustical or electromagnetic radiation (including optical, ultraviolet, X-ray, Yray, γ-ray synchrotron, infrared, microwave or radiofrequency), the detailed description hereof, concerning optical radiation primarily, being strictly by way of example and not intended to be limiting.

What is claimed is:

1. A dynamic method of holographic inspection by creating a hologram of an inspected object, carried out with inspection using paired exposures
   including the steps of
   subjecting an object to intermittent stressing,
   detecting via waves constructed from the finished hologram or holograms at least one of the groups of fine and/or gross alterations in individual structures and regions of said object response to application of said intermittent stressing,
   creating a hologram by intermittent exposures of a holographic emulsion or other sensor to reference radiation and the analytical radiation which is passed through or reflected from said object
   to provide a hologram selected from the group consisting of
   a positively unbalanced hologram formed by a first exposure of a holographic emulsion, or other sensor, to the interference pattern of a reference wave and a first compared object wave, the integrated intensity of exposure to the reference wave being $(1+\epsilon)$ units, and by a second exposure of said holographic emulsion, or other sensor, to the interference pattern from the reference wave and a second compared object wave, with the integrated intensity of exposure to the reference wave being $(1-\epsilon)$ units
   and the optical path of the reference wave during the second exposure differing by one-half wavelength from the optical path of the reference wave during the first exposure, or
   a negatively unbalanced hologram formed by
   a first exposure of a holographic emulsion, or other sensor, to the interference pattern of a reference wave and a first compared object wave, with the integrated intensity of exposure to the reference wave being $(1-\epsilon)$ units, and by a second exposure of said holographic emulsion, or other sensor, to the interference pattern from the reference wave and a second compared object wave, with the integrated intensity of exposure to the reference wave being $(1+\epsilon)$ units
   and the optical path of the reference wave during the second exposure differing by one-half wavelength from the optical path of the reference wave during the first exposure, or
   a phase-advanced hologram formed by a first exposure of a holographic emulsion, or other sensor, to the interference pattern of a reference wave and a first compared object wave and by a second exposure of said holographic emulsion to an interference pattern from the reference wave and a second compared object wave, in each exposure the integrated intensity of exposure to the reference wave being one unit, and the optical path of the reference wave during the second exposure differing by $(\frac{1}{2}+q)$ wavelength from the optical path of the reference wave during the first exposure, or,
   a phase-retarded hologram formed by a first exposure of a holographic emulsion, or other sensor, to the interference pattern from a reference wave and a first compared object wave and by a second exposure of said holographic emulsion, or other sensor, to the interference pattern from the reference wave and a second compared object wave, in each exposure the integrated intensity of exposure to the reference wave being one unit and the optical path of the reference wave during the second exposure differing by $(\frac{1}{2}-q)$ wavelength from the optical path of the reference wave during the first exposure,
   wherein $\epsilon$ is substantially greater than 0 and less than or equal to 0.5 and
   wherein q is substantially greater than 0 and less than or equal to 0.25.

2. A dynamic method of holographic inspection according to claim 1 wherein there are obtained sequential holograms of an intermittently stressed object under inspection which represent instantaneous states of said object.

3. A dynamic method of holographic inspection according to claim 1 wherein two holographic exposures are made simultaneously on the same holographic recording medium, each utilizing a preselected different wavelength as the interference radiation.

4. A dynamic method of holographic inspection according to claim 1 wherein two holographic exposures are made simultaneously on the same holographic recording medium, each utilizing the same preselected wavelength as the interference radiation.

5. An apparatus for dynamic holographic inspection comprising, in combination,
at least one coherent radiation source directed toward an object which is subjected to inspection,
means in association with said radiation source for carrying out the inspection by creating a hologram of said object using paired exposures
including means for subjecting said object to intermittent stressing during the inspection, and means for detecting, via waves constructed from the finished hologram or holograms, at least one of the group fine and/or gross alterations in individual structures and regions of said object responsive to application of said intermittent stressing, said hologram or holograms being created by intermittent exposure of a holographic emulsion or other sensor to reference radiation and the analytical radiation which is passed through or reflected from said object to provide a hologram selected from the group consisting of (a) a positively unbalanced hologram formed by a first exposure of holographic emulsion, or other sensor, to the interference pattern of a reference wave and a first compared object wave, the integrated intensity of exposure to the reference wave being $(1+\epsilon)$ units, and by a second exposure of said holographic emulsion, or other sensor, to the interference pattern of the reference wave and a second compared object wave, with the integrated intensity of exposure to the reference wave being $(1-\epsilon)$ units
and the optical path of the reference wave during the second exposure differing by one-half wavelength from the optical path of the reference wave during the first exposure; or (b) a negatively unbalanced hologram formed by a first exposure of a holographic emulsion, or other sensor, to the interference pattern of a reference wave and a first compared object wave, with the integrated intensity of exposure to the reference wave being $(1-\epsilon)$ units, and by a second exposure of said holographic emulsion, or other sensor, to the interference pattern of the reference wave and the second compared object wave, with the integrated intensity of exposure to the reference wave being $(1+\epsilon)$ units,
and the optical path of the reference wave during the second exposure differing by one-half wavelength from the optical path of the reference wave during the first exposure, or (c) a phase-advanced hologram formed by a first exposure of a holographic emulsion, or other sensor, to the interference pattern of a reference wave and a first compared object wave and by a second exposure of said holographic emulsion to the interference pattern of the reference wave and a second compared object wave, in each exposure the integrated intensity of exposure to the reference wave being one unit, and the optical path of the reference wave during the second exposure differing by $(\frac{1}{2}+q)$ wavelength from the optical path of the reference wave during the first exposure or (d) a phase retarded hologram formed by a first exposure of the holographic emulsion, or other sensor, to the interference pattern of a reference wave and a first compared object wave and by a second exposure of said holographic emulsion, or other sensor, to the interference pattern of the reference wave and a second compared object wave, in each exposure the integrated intensity of exposure to the reference wave being one unit and the optical path of the reference wave during the second exposure differing by $(\frac{1}{2}-q)$ wavelength from the optical path of the reference wave during the first exposure, wherein $\epsilon$ is substantially greater than 0 and less than or equal to 0.5 and
wherein $q$ is substantially greater than 0 and less than or equal to 0.25.

6. Apparatus for dynamic holographic inspection according to claim 5 provided with a plurality of independent, parallel-connected interference channels provided with means for interposing said interference channels in preselected order in interferometric relationship with the object inspection channel to form holograms on a common recording medium.

7. Apparatus for dynamic holographic inspection according to claim 5 provided with means for stressing an object in inspection to determine interferometrically the distortion effects caused by said stressing.

8. Apparatus for dynamic holographic inspection according to claim 5 provided with a plurality of individual radiation sources of preselected radiation wavelengths, and means for selectively directing the radiation from said individual coherent radiation sources via both the object inspection channel and an interference channel to obtain the corresponding interferometric hologram.

9. Apparatus for dynamic holographic inspection according to claim 5 incorporating a Bragg diffractor in at least one of the object or reference channels to accomplish the radiation shuttering function.

* * * * *